(12) United States Patent
Carlsen

(10) Patent No.: US 12,098,701 B2
(45) Date of Patent: Sep. 24, 2024

(54) WIND TURBINE WITH EXTENDABLE AND RETRACTABLE AIRFOILS

(71) Applicant: Erik K. Carlsen, Oxford, PA (US)

(72) Inventor: Erik K. Carlsen, Oxford, PA (US)

( * ) Notice: Subject to any disclaimer, the term of this patent is extended or adjusted under 35 U.S.C. 154(b) by 0 days.

(21) Appl. No.: 17/989,171

(22) Filed: Nov. 17, 2022

(65) Prior Publication Data
US 2023/0184211 A1 Jun. 15, 2023

Related U.S. Application Data

(60) Provisional application No. 63/287,703, filed on Dec. 9, 2021.

(51) Int. Cl.
*F03D 3/00* (2006.01)
*F03D 3/06* (2006.01)

(52) U.S. Cl.
CPC .............. *F03D 3/005* (2013.01); *F03D 3/062* (2013.01); *F05B 2240/214* (2013.01); *F05B 2260/30* (2013.01); *F05B 2260/50* (2013.01)

(58) Field of Classification Search
CPC .... F03D 3/005; F03D 3/062; F05B 2240/214; F05B 2240/202; F05B 2260/30; F05B 2260/50; Y02E 10/72
See application file for complete search history.

(56) References Cited

U.S. PATENT DOCUMENTS

| | | | | |
|---|---|---|---|---|
| 4,087,202 A * | 5/1978 | Musgrove | ............... | F03D 3/061 416/135 |
| 4,421,458 A * | 12/1983 | Allan | ..................... | F03D 3/064 416/119 |
| 4,624,624 A * | 11/1986 | Yum | ....................... | F03D 3/061 416/142 |
| 5,454,694 A * | 10/1995 | O'Dell | .................. | F03D 3/0427 415/4.4 |
| 7,241,105 B1 * | 7/2007 | Vanderhye | ............. | B63H 13/00 415/4.4 |
| 7,396,207 B2 * | 7/2008 | DeLong | ................ | F03D 1/0608 416/240 |

(Continued)

FOREIGN PATENT DOCUMENTS

| CN | 107387314 A | * 11/2017 | ............. F03D 3/062 |
|---|---|---|---|
| KR | 20120116199 A | * 10/2012 | |

(Continued)

OTHER PUBLICATIONS

Feng et al. CN_110460194_A_I, English Machine Translation (Year: 2019).*

(Continued)

*Primary Examiner* — Justin D Seabe
*Assistant Examiner* — Wayne A Lambert
(74) *Attorney, Agent, or Firm* — McCarter & English, LLP

(57) ABSTRACT

An example wind turbine is provided that includes a shaft assembly, strut mounts coupled to the shaft assembly, airfoils directly or indirectly coupled to the strut mounts, and a generator assembly connected to the shaft assembly. The shaft assembly defines a central longitudinal axis of the wind turbine. The airfoils are capable of being positioned in a fully extended orientation and a fully retracted orientation. Rotation of the airfoils results in rotation of at least a portion of the shaft assembly to generate electrical current with the generator assembly.

14 Claims, 19 Drawing Sheets

(56) References Cited

U.S. PATENT DOCUMENTS

| | | | | |
|---|---|---|---|---|
| 7,766,600 | B1* | 8/2010 | Vanderhye | F03D 9/32 |
| | | | | 416/243 |
| 8,322,989 | B2* | 12/2012 | Ozkul | F03D 7/06 |
| | | | | 416/157 R |
| 9,249,778 | B2* | 2/2016 | Paulin | F03D 3/005 |
| 9,631,503 | B2* | 4/2017 | Ehrnberg | F03B 3/14 |
| 10,808,677 | B2* | 10/2020 | Zaplitny | F03D 13/40 |
| 2010/0172759 | A1* | 7/2010 | Sullivan | F03D 9/25 |
| | | | | 416/41 |
| 2010/0303613 | A1* | 12/2010 | Schiel | F03D 3/068 |
| | | | | 415/148 |
| 2011/0042958 | A1* | 2/2011 | Vander Straeten | F03D 13/20 |
| | | | | 290/55 |
| 2011/0133474 | A1* | 6/2011 | Haar | F03D 7/0232 |
| | | | | 290/55 |
| 2016/0312770 | A1* | 10/2016 | Mendieta Echevarria | |
| | | | | F03D 3/064 |
| 2018/0017038 | A1* | 1/2018 | Cimatti | F03D 3/068 |
| 2018/0156193 | A1* | 6/2018 | Hench | F03D 3/005 |
| 2020/0132047 | A1* | 4/2020 | Saeed | F03D 9/25 |

FOREIGN PATENT DOCUMENTS

| | | | | |
|---|---|---|---|---|
| WO | WO-2010148071 A1 * | 12/2010 | | F03D 3/062 |
| WO | WO-2013082635 A1 * | 6/2013 | | F03D 3/005 |

OTHER PUBLICATIONS

Sin KR 20120116199 Espacenet—English Machine Translation (Year: 2012).*

Zhang et al. CN107387314 Espacenet—English Machine Translation (Year: 2017).*

* cited by examiner

WIND TURBINE WITH EXTENDABLE AND RETRACTABLE AIRFOILS

CROSS-REFERENCE TO RELATED APPLICATION

This application claims the benefit of U.S. Provisional Patent Application No. 63/287,703, which was filed on Dec. 9, 2021, the entire content of which is incorporated herein by reference.

TECHNICAL FIELD

The present disclosure relates generally to wind turbines and, more specifically, to a foldable, vertical axis wind turbine (VAWT) that provides for efficient and effective operation.

BACKGROUND

Different configurations of wind turbines are available in the industry for use in a variety of applications. Traditional wind turbines can be of the horizontal (e.g., propeller) type, or of the vertical type. In some instances, wind turbines can be installed on a sailboat. For such installations, important considerations may include ease of installation, compactness, safety from blades, low noise, and self-protection from high winds.

SUMMARY

In accordance with embodiments of the present disclosure, an exemplary wind turbine is provided. The wind turbine includes a shaft assembly, strut mounts, airfoils, and a generator assembly. The shaft assembly defines a central longitudinal axis. The strut mounts are coupled to the shaft assembly. The airfoils are directly or indirectly coupled to the strut mounts. The airfoils are capable of being positioned in a fully extended orientation and a fully retracted orientation (and any position therebetween). The generator assembly is connected to the shaft assembly. Rotation of the airfoils results in rotation of at least a portion of the shaft assembly to generate electrical current with the generator assembly.

In some embodiments, the shaft assembly can include an inner shaft, an intermediate shaft, and an outer shaft. The intermediate shaft can be concentrically and rotatably positioned over the inner shaft, and the outer shaft can be concentrically and rotatably positioned over the intermediate shaft. In some embodiments, the inner shaft can be configured and dimensioned to receive therethrough a stay of a sailboat for installation of the wind turbine on the stay. In some embodiments, the outer shaft can include threads formed in an outer surface of the outer shaft. In some embodiments, the intermediate shaft can include threads formed in an outer surface of the intermediate shaft.

In some embodiments, the strut mounts can include a first strut mount fixedly coupled to the intermediate shaft, a second strut mount freely movable over the intermediate shaft, a third strut mount fixedly coupled to the intermediate shaft, and a fourth strut mount threadingly engaged with an outer surface of the outer shaft. In some embodiments, the wind turbine can include rods extending between and mechanically coupling the second strut mount to the fourth strut mount, the rods slidably extending through the third strut mount.

In some embodiments, the airfoils can be indirectly coupled to the strut mounts with strut assemblies. In some embodiments, each strut assembly can include an upper strut and a lower strut pivotably coupled to each other through a pivot support at one end, and pivotably coupled to respective strut members at opposing ends. In the fully extended orientation, the upper and lower struts can be positioned against (or substantially against) each other. In the fully retracted orientation, the upper and lower struts can be spaced from each other and remain pivotably coupled to each other through the pivot support.

The airfoils remain in a parallel (or substantially parallel) orientation relative to the central longitudinal axis in both the fully extended orientation and the fully retracted orientation. The airfoils remain in a parallel (or substantially parallel) orientation relative to the central longitudinal axis in intermediate orientations between the fully extended orientation and the fully retracted orientation.

The generator assembly can include a stator housing, a generator rotor housing, and a furling motor rotor housing. In some embodiments, the stator housing can be fixedly coupled to an inner shaft of the shaft assembly, the generator rotor housing can be fixedly coupled to an intermediate shaft of the shaft assembly, and the furling motor rotor housing can be fixedly coupled to an outer shaft of the shaft assembly. In some embodiments, the stator housing can include a first set of windings positioned around a second set of windings. In some embodiments, the generator rotor housing can include a first set of magnets dimensionally and positionally corresponding with the second set of windings of the stator housing to generate the electrical current. In some embodiments, the furling motor rotor housing can include a second set of magnets dimensionally and positionally corresponding with the first set of windings of the stator housing to generate a counter electrical current for furling and unfurling of the airfoils. The generator assembly can include a generator rotor/stator assembly and a furling motor/stator assembly integrally formed and connected to the shaft assembly. In some embodiments, the wind turbine can include a mechanical or electrical safety mechanism configured to position the airfoils into the fully retracted orientation.

In accordance with embodiments of the present disclosure, an exemplary method of operating a wind turbine is provided. The method includes moving airfoils of the wind turbine from a fully retracted orientation to a fully extended orientation. The airfoils are directly or indirectly coupled to strut mounts of the wind turbine. The strut mounts are coupled to a shaft assembly of the wind turbine. The shaft assembly defines a central longitudinal axis. Rotation of the airfoils results in rotation of at least a portion of the shaft assembly to generate electrical current with a generator assembly connected to the shaft assembly.

Other features and advantages will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed wind turbine, reference is made to the accompanying figures, wherein.

DETAILED DESCRIPTION

Figure 1:
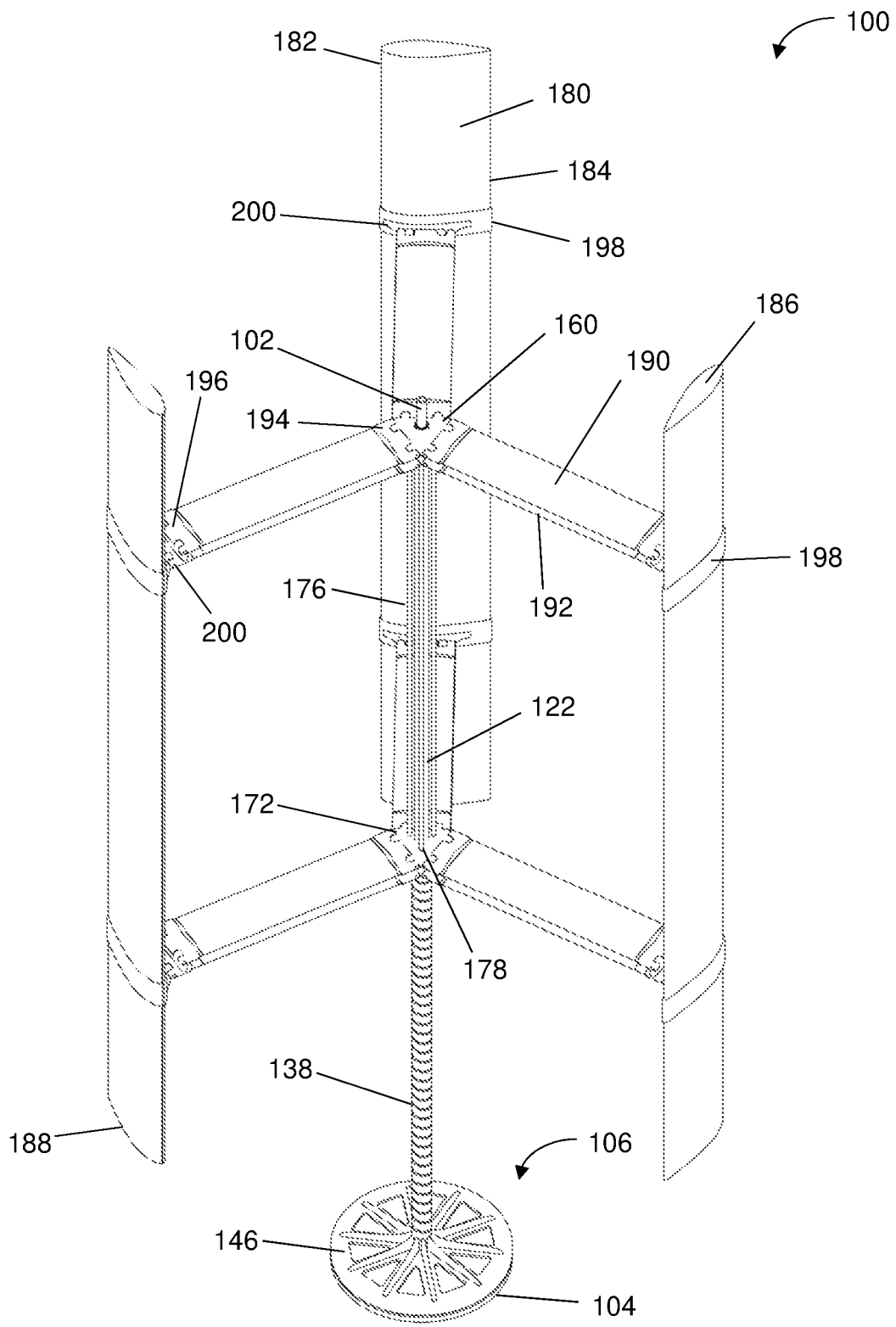
FIG. 1 is a perspective view of an exemplary wind turbine in accordance with the present disclosure in a fully open or extended position.
Figure 2:
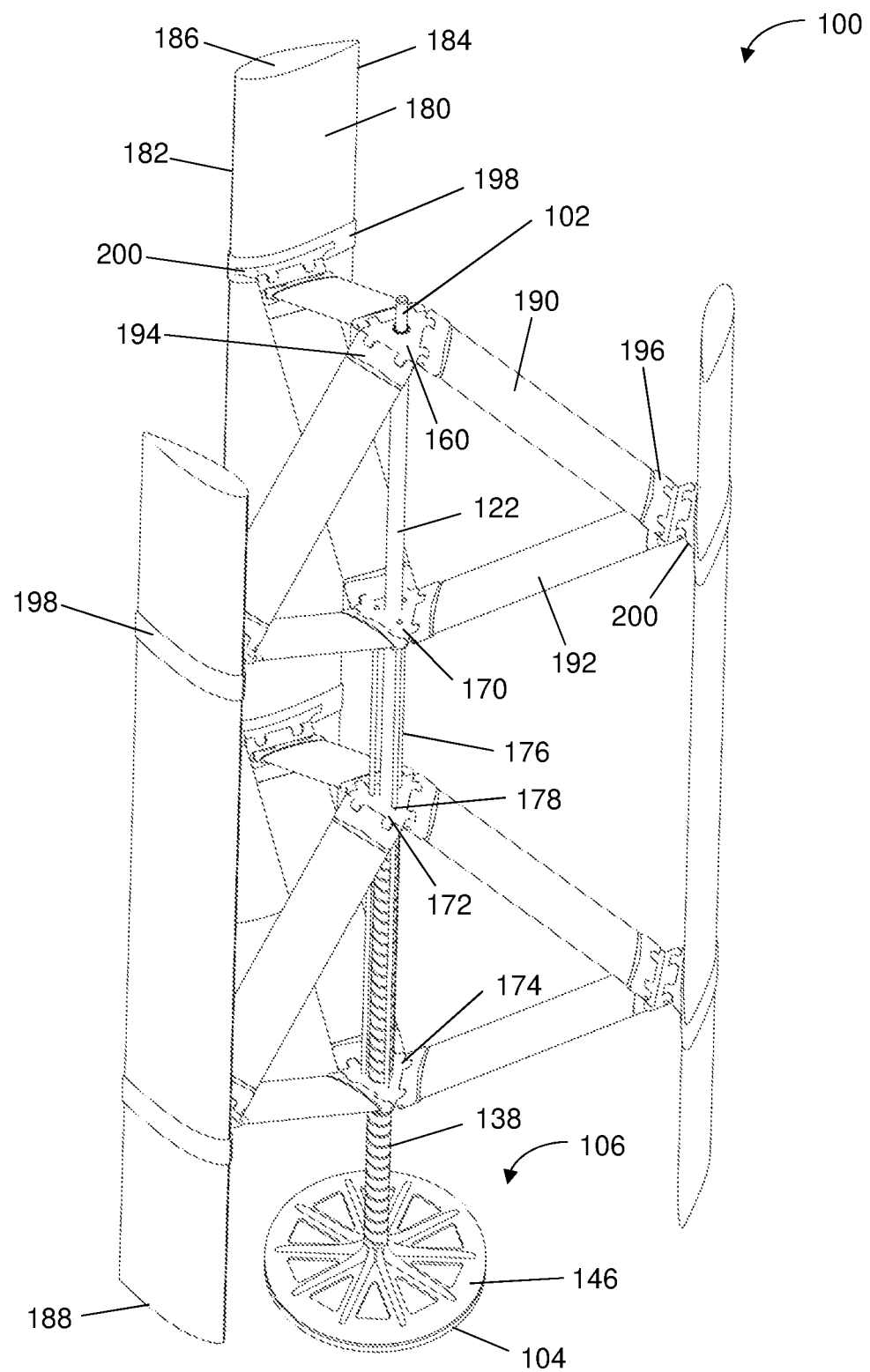
FIG. 2 is a perspective view of an exemplary wind turbine of FIG. 1 in a partially furled or retracted position.
Figure 3:
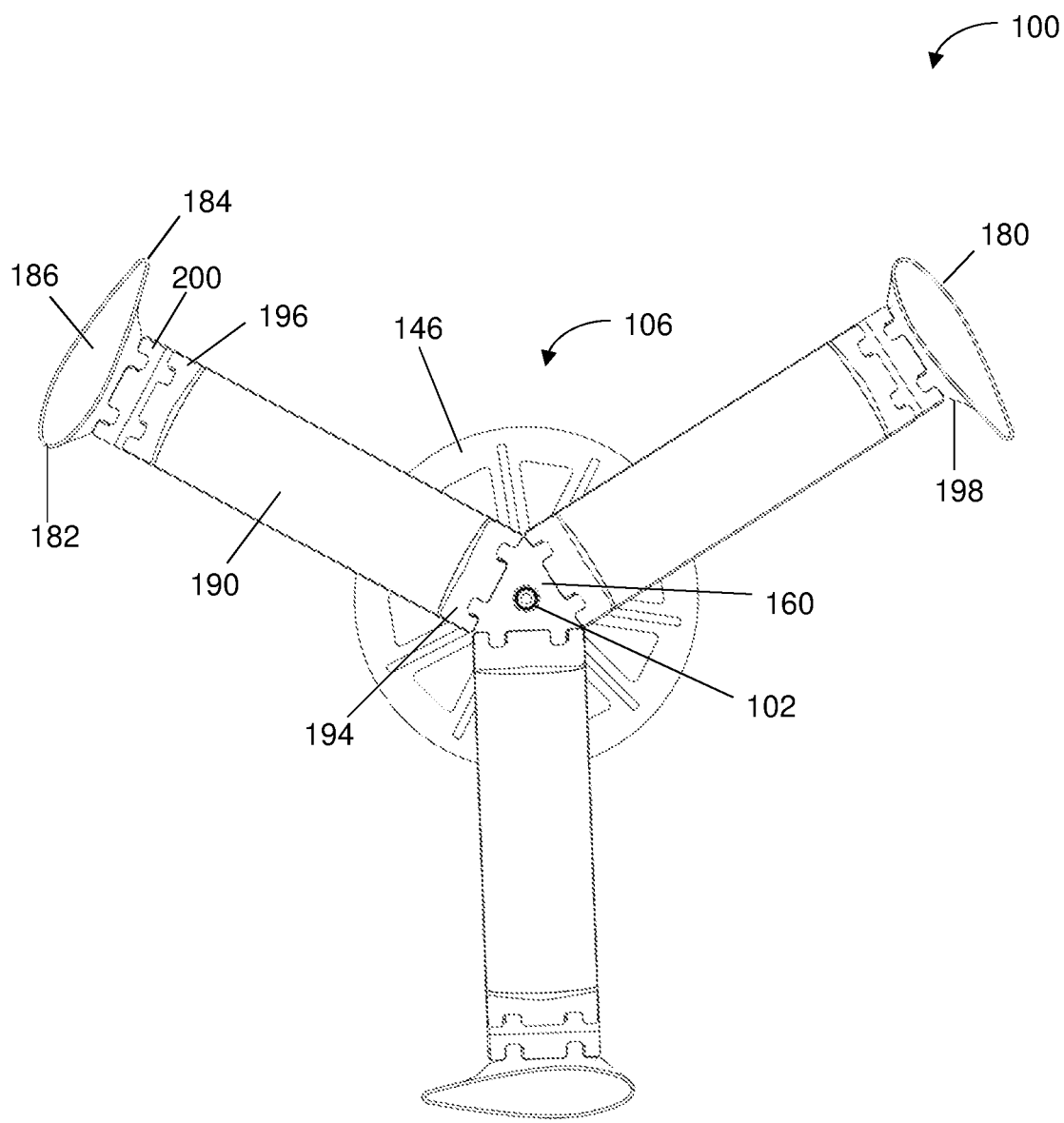
FIG. 3 is a top view of an exemplary wind turbine of FIG. 1 in a partially furled or retracted position.
Figure 4:
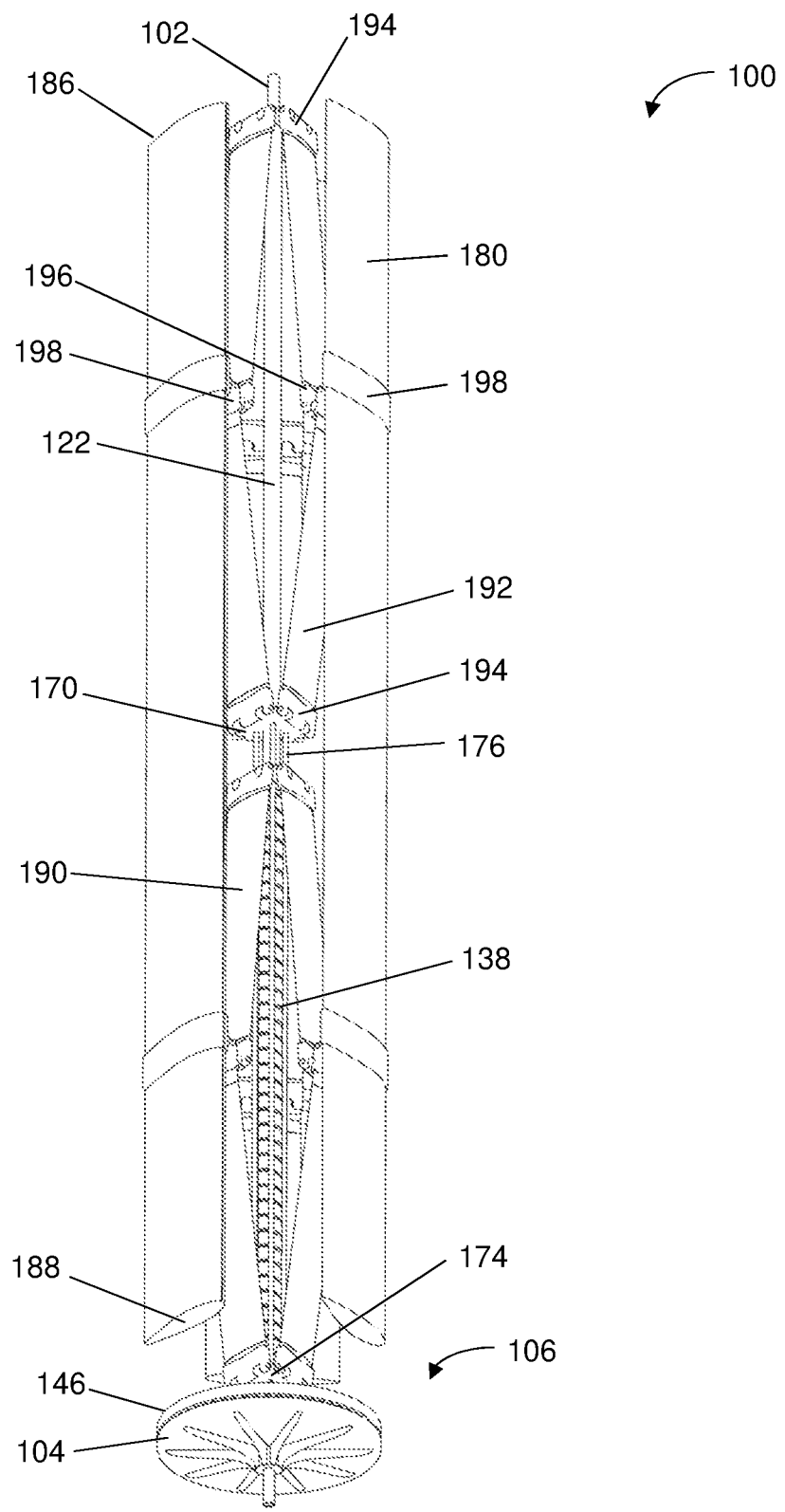
FIG. 4 is a perspective view of an exemplary wind turbine of FIG. 1 in a fully furled or retracted position.
Figure 5:
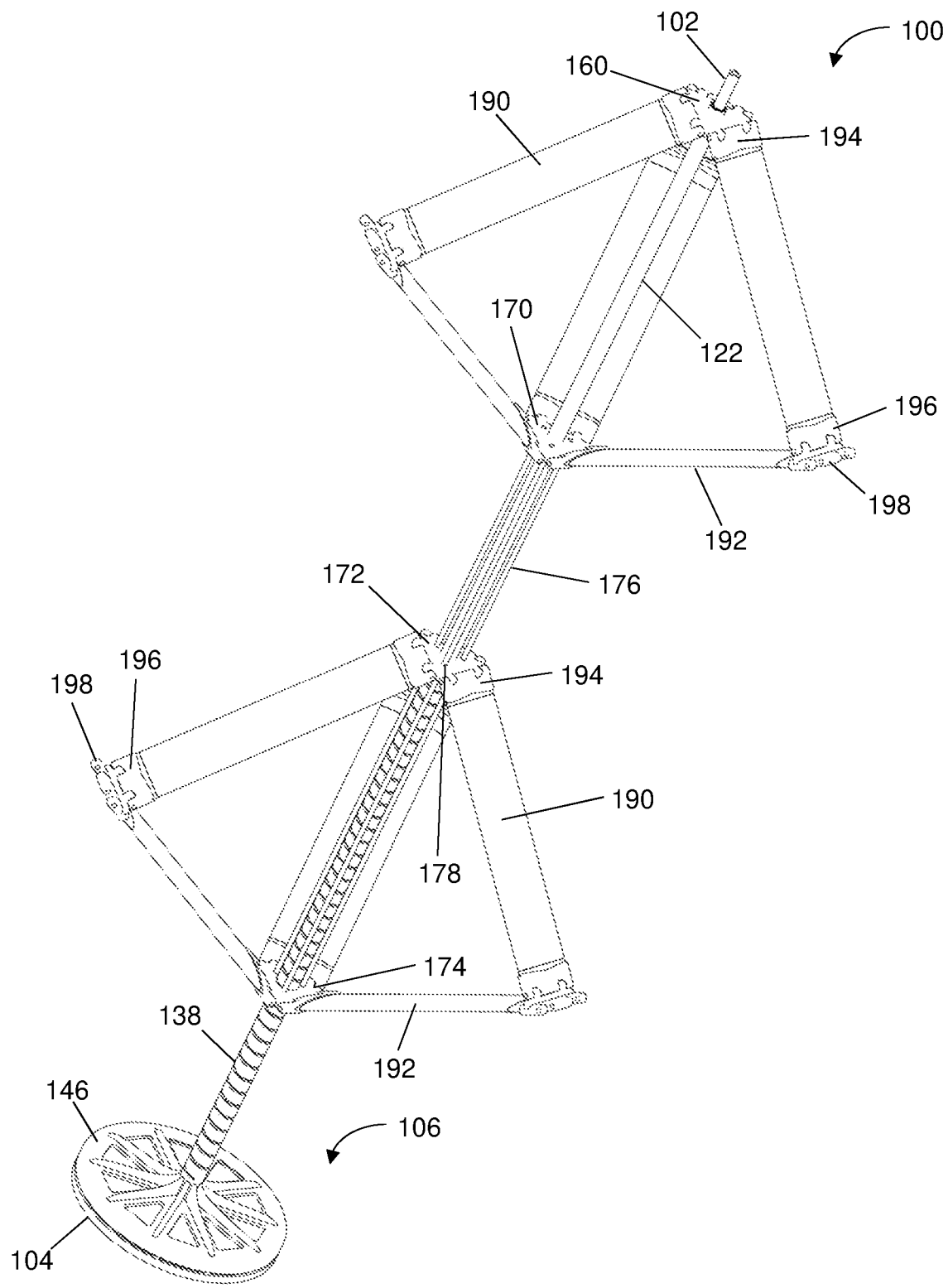
FIG. 5 is a perspective, partial view of an exemplary wind turbine of FIG. 1 in a partially furled or retracted position.

FIGS. 1-9 are perspective, partial, exploded and cross-sectional views of an exemplary wind generator or turbine 100 (hereinafter "wind turbine 100"). The wind turbine 100 includes an inner shaft 102 (e.g., a first or innermost shaft) that extends the length of the wind turbine 100 along a central longitudinal axis 108 of the wind turbine 100. The inner shaft 102 acts as a stationary or static shaft, while other components of the wind turbine 100 (including other shafts) rotatably move relative to the inner shaft 102. In some embodiments, the inner shaft 102 can have a hollow interior. The inner shaft 102 can have an outer diameter of about, e.g., 25-30 mm inclusive, 25-29 mm inclusive, 25-28 mm inclusive, 25-27 mm inclusive, 25-26 mm inclusive, 26-30 mm inclusive, 27-30 mm inclusive, 28-30 mm inclusive, 29-30 mm inclusive, 25 mm, 26 mm, 27 mm, 28 mm, 29 mm, 30 mm, or the like, and the inner diameter of the hollow interior of the shaft 102 can be about, e.g., 13-19 mm inclusive, 13-18 mm inclusive, 13-17 mm inclusive, 13-16 mm inclusive, 13-15 mm inclusive, 13-14 mm inclusive, 14-19 mm inclusive, 15-19 mm inclusive, 16-19 mm inclusive, 17-19 mm inclusive, 18-19 mm inclusive, 13 mm, 14 mm, 15 mm, 16 mm, 17 mm, 18 mm, 19 mm, or the like. In some embodiments, the inner shaft 102 can receive therethrough a stay or wire associated with a mast of a sailboat, such that the entire wind turbine 100 is laterally supported by the standing rigging of the sailboat. Static axial positioning and wind driven generator torque resistance of the inner shaft 102 can be accomplished by rigidly coupling, attaching, or gripping the shaft 102 to the inner stay, shroud, or wire, and/or extending to join a chain plate, tang, or otherwise fixed mount of the sailboat. In some embodiments, the wind turbine 100 can be installed on a shroud or pole of a sailboat. Such installation allows the wind turbine 100 to be supported by existing structure on the sailboat without necessitating additional structural elements for support. Although discussed herein with respect to a sailboat, it should be understood that the wind turbine 100 could be used in other (e.g., standalone) installations or environments.

Both opposing proximal and distal ends of the inner shaft 102 include openings extending into the hollow interior, e.g., to allow for passage of the stay through the hollow interior of the inner shaft 102, in some instances. At or near one of the ends (e.g., the distal end), the inner shaft 102 includes a stator housing 104 fixedly mounted to the exterior of the inner shaft 102. As will be discussed in greater detail below, the stator housing 104 is one of the components which forms an integrally configured furling motor/generator assembly 106 of the wind turbine 100. The stator housing 104 can define a substantially circular or cylindrical configuration. In some embodiments, the outer diameter of stator housing 104 can be about, e.g., 390-410 mm inclusive, 390-405 mm inclusive, 390-400 mm inclusive, 390-395 mm inclusive, 395-410 mm inclusive, 400-410 mm inclusive, 405-410 mm inclusive, 390 mm, 395 mm, 400 mm, 405 mm, 410 mm, or the like. A bottom or outer surface of the stator housing 104 can include radial ribs 110 extending from a substantially flat bottom surface of the stator housing 104 to a central post 112 positioned around the inner shaft 102. The ribs 110 provide structural support for the stator housing 104.

The top or inner surface of the stator housing 104 defines a substantially flat surface with intermediate radial grooves or recessed areas 113 formed near the perimeter edge of the stator housing 104. The downwardly directed areas 113 extend substantially parallel to the curvature of the perimeter edge of the stator housing 104, thereby also defining a curved configuration. In some embodiments, each of the areas 113 can be about, e.g., 60-90 mm inclusive, 60-85 mm inclusive, 60-80 mm inclusive, 60-75 mm inclusive, 60-70 mm inclusive, 60-65 mm inclusive, 65-90 mm inclusive, 70-90 mm inclusive, 75-90 mm inclusive, 80-90 mm inclusive, 85-90 mm inclusive, 60 mm, 65 mm, 70 mm, 75 mm, 80 mm, 85 mm, 90 mm, or the like, in length. The stator housing 104 includes downwardly directed, wedge shaped recessed areas 114 formed in the top or inner surface, the areas 114 radially spaced around a central planar section 116. The outer radial edge of the recessed areas 114 can substantially align with and corresponds with a respective area 113. In some embodiments, the stator housing 104 can include about twelve areas 113 and corresponding areas 114 radially formed in the top surface of the stator housing 104. Each of the areas 113 receives windings 118 (e.g., a first set of windings) that define the outer windings of the stator housing 104, and each of the areas 114 receives windings 120 (e.g., a second set of windings) that define the inner windings of the stator housing 104. The windings 120 can be positioned against the inner walls of the areas 114, leaving the central area of the areas 114 clear of windings. The stator housing 104 with the windings 118, 120 defines the stator of the wind turbine 100. As discussed herein, the outer windings 118 are used for the furling motor, while the inner windings 120 are used for the generator in the wind turbine 100.

The wind turbine 100 includes an intermediate shaft 122 (e.g., a second shaft) rotatably positioned over at least a portion of the inner shaft 102. The intermediate shaft 122 includes an opening 126 leading to a hollow interior configured and dimensioned to receive the inner shaft 102 therethrough. In some embodiments, the outer diameter of the intermediate shaft 122 can be about, e.g., 29-35 mm inclusive, 29-34 mm inclusive, 29-33 mm inclusive, 29-32 mm inclusive, 29-31 mm inclusive, 29-30 mm inclusive, 30-35 mm inclusive, 31-35 mm inclusive, 32-35 mm inclusive, 33-35 mm inclusive, 34-35 mm inclusive, 29 mm, 30 mm, 31 mm, 32 mm, 33 mm, 34 mm, 35 mm, or the like, and the inner diameter of the hollow interior of the intermediate shaft 122 can be about, e.g., 25-30 mm inclusive, 26-30 mm inclusive, 27-30 mm inclusive, 28-30 mm inclusive, 29-30 mm inclusive, 25-29 mm inclusive, 25-28 mm inclusive, 25-27 mm inclusive, 25-26 mm inclusive, 25 mm, 26 mm, 27 mm, 28 mm, 29 mm, 30 mm, or the like. Bearings 124 can be positioned between the shafts 102, 122 to allow for rotation of the intermediate shaft 122 around the inner shaft 102.

At one of the ends (e.g., the distal end), the intermediate shaft 122 includes a generator rotor housing 128 fixedly mounted to the outer surface of the intermediate shaft 122. The rotor housing 128 defines a generally circular or cylindrical configuration. The outer diameter of the rotor housing 128 is dimensioned smaller than the outer diameter of the stator housing 104. In some embodiments, the outer diameter of the rotor housing 128 can be about, e.g., 340-360 mm inclusive, 340-355 mm inclusive, 340-350 mm inclusive, 340-345 mm inclusive, 345-360 mm inclusive, 350-360 mm inclusive, 355-360 mm inclusive, 340 mm, 345 mm, 350 mm, 355 mm, 360 mm, or the like. The top surface of the rotor housing 128 defines a substantially planar surface. The bottom surface of the rotor housing 128 includes wedge shaped recessed areas 130 radially formed around a central planar section 132. Each of the recessed areas 130 receives a complementary wedge-shaped magnet 134. The dimensions and/or positions of the magnets 134 substantially correspond with the dimensions of the areas 114 and windings 120 of the stator housing 104. Rotation of the intermediate shaft 122 simultaneously results in rotation of the rotor housing 128, with rotational movement of the magnets 134 relative to the windings 120 acting as a generator for the wind turbine 100 and producing electricity from the wind turbine 100.

The wind turbine 100 includes an outer shaft 138 (e.g., a third or outermost shaft) rotatably positioned over at least a portion of the intermediate shaft 122. Collectively, the inner shaft 102, the intermediate shaft 122, and the outer shaft 138 define a shaft assembly of the wind turbine 100. The outer shaft 138 includes an opening 140 leading to a hollow interior configured and dimensioned to receive the intermediate shaft 122 therethrough. In some embodiments, the outer diameter of the outer shaft 138 can be about, e.g., 33-39 mm inclusive, 33-38 mm inclusive, 33-37 mm inclusive, 33-36 mm inclusive, 33-35 mm inclusive, 33-34 mm inclusive, 34-39 mm inclusive, 35-39 mm inclusive, 36-39 mm inclusive, 37-39 mm inclusive, 38-39 mm inclusive, 33 mm, 34 mm, 35 mm, 36 mm, 37 mm, 38 mm, 39 mm, or the like, and the inner diameter of the hollow interior of the outer shaft 138 can be about, e.g., 43-49 mm inclusive, 43-48 mm inclusive, 43-47 mm inclusive, 43-46 mm inclusive, 43-45 mm inclusive, 43-44 mm inclusive, 44-49 mm inclusive, 45-49 mm inclusive, 46-49 mm inclusive, 47-49 mm inclusive, 48-49 mm inclusive, 43 mm, 44 mm, 45 mm, 46 mm, 47 mm, 48 mm, 49 mm, or the like. Bearings 142 can be positioned between the shafts 122, 138 to allow for rotation of the outer shaft 138 around the intermediate shaft 122. The outer surface of the outer shaft 138 includes threads 144 formed therein, resulting in a jack screw configuration of the outer shaft 138. In some embodiments, the threads 144 can be high friction threads for improved and accurate operation.

At one of the ends (e.g., the distal end), the outer shaft 138 includes a furling motor rotor housing 146 fixedly secured to the outer surface of the shaft 138. Thus, rotation of the shaft 138 simultaneously rotates the housing 146. The rotor housing 146 defines a substantially circular or cylindrical configuration. In some embodiments, the outer diameter of the rotor housing 146 can be about, e.g., 390-410 mm inclusive, 390-405 mm inclusive, 390-400 mm inclusive, 390-395 mm inclusive, 395-410 mm inclusive, 400-410 mm inclusive, 405-410 mm inclusive, 390 mm, 395 mm, 400 mm, 405 mm, 410 mm, or the like. In some embodiments, the outer diameter of the rotor housing 146 substantially corresponds with the other diameter of the stator housing 104. The bottom surface of the rotor housing 146 includes a circular, central recessed section 148 having a diameter and depth complementary to the outer diameter of the rotor housing 128 such that the rotor housing 128 can entirely (or substantially entirely) fit within the volume of the recessed section 148. A radial step 150 is formed between the bottom surface of the rotor housing 146 and the recessed section 148.

The rotor housing 146 includes openings 152 formed in the bottom surface near the perimeter edge. The openings 152 are radially positioned in a spaced manner along the entire circumference of the rotor housing 146. Each opening 152 receives a complementary magnet 154. In some embodiments, the magnets 154 may partially extend beyond the plane defined by the bottom surface of the rotary housing 146. In some embodiments, the magnets 154 can be substantially flush with the bottom surface of the rotary housing 146. When assembled with the stator housing 104, in some embodiments, the position of the magnets 154 can correspond with the radial position of the windings 118 to form a motor (and/or generator) for the furling and unfurling action of the wind turbine 100. In some embodiments, an odd or even number of magnets 154 (as compared to the windings 118) could be used.

Figure 6:
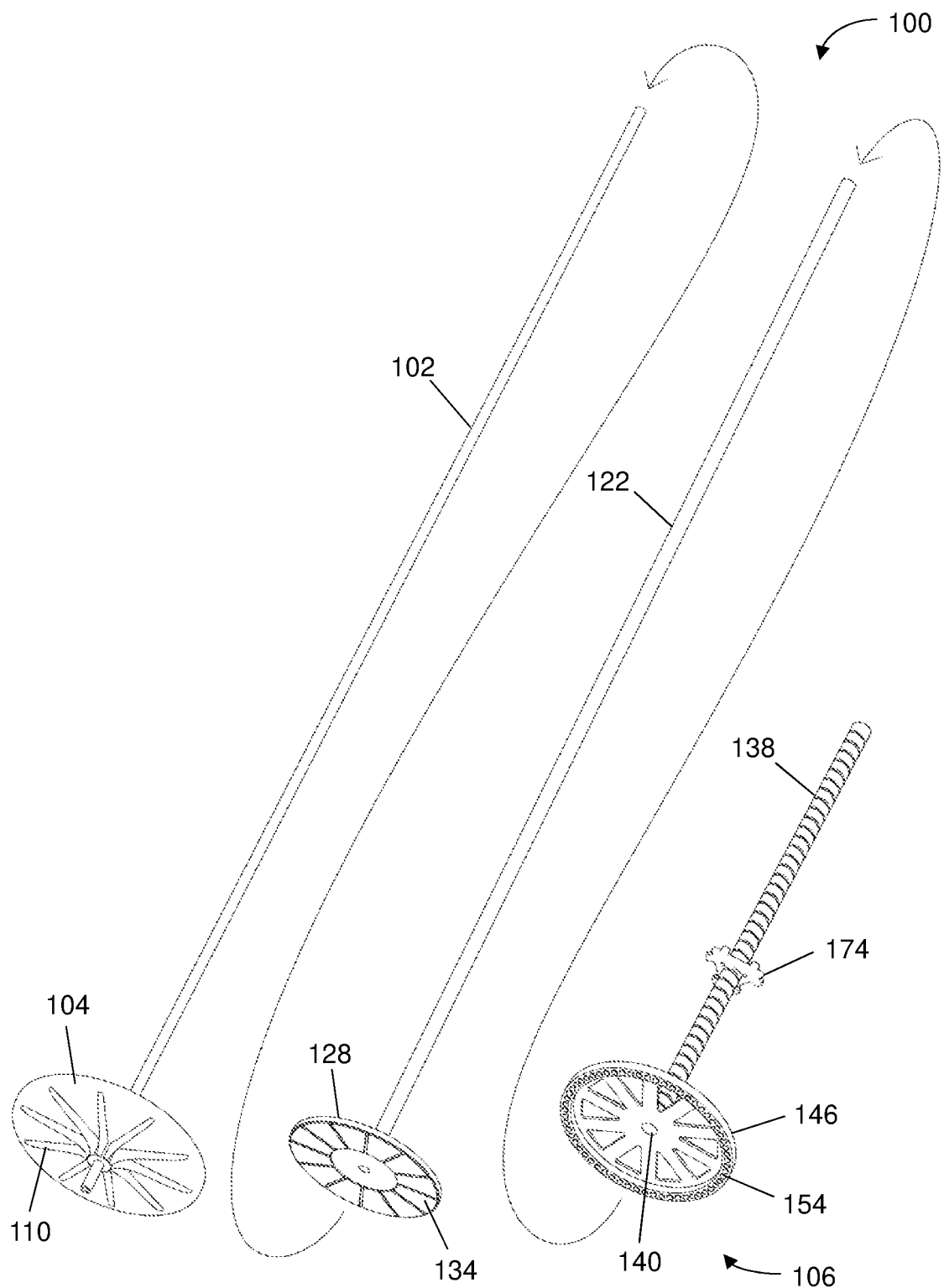
FIG. 6 is a perspective, exploded view of a furling motor/generator assembly of an exemplary wind turbine of FIG. 1.
Figure 7:
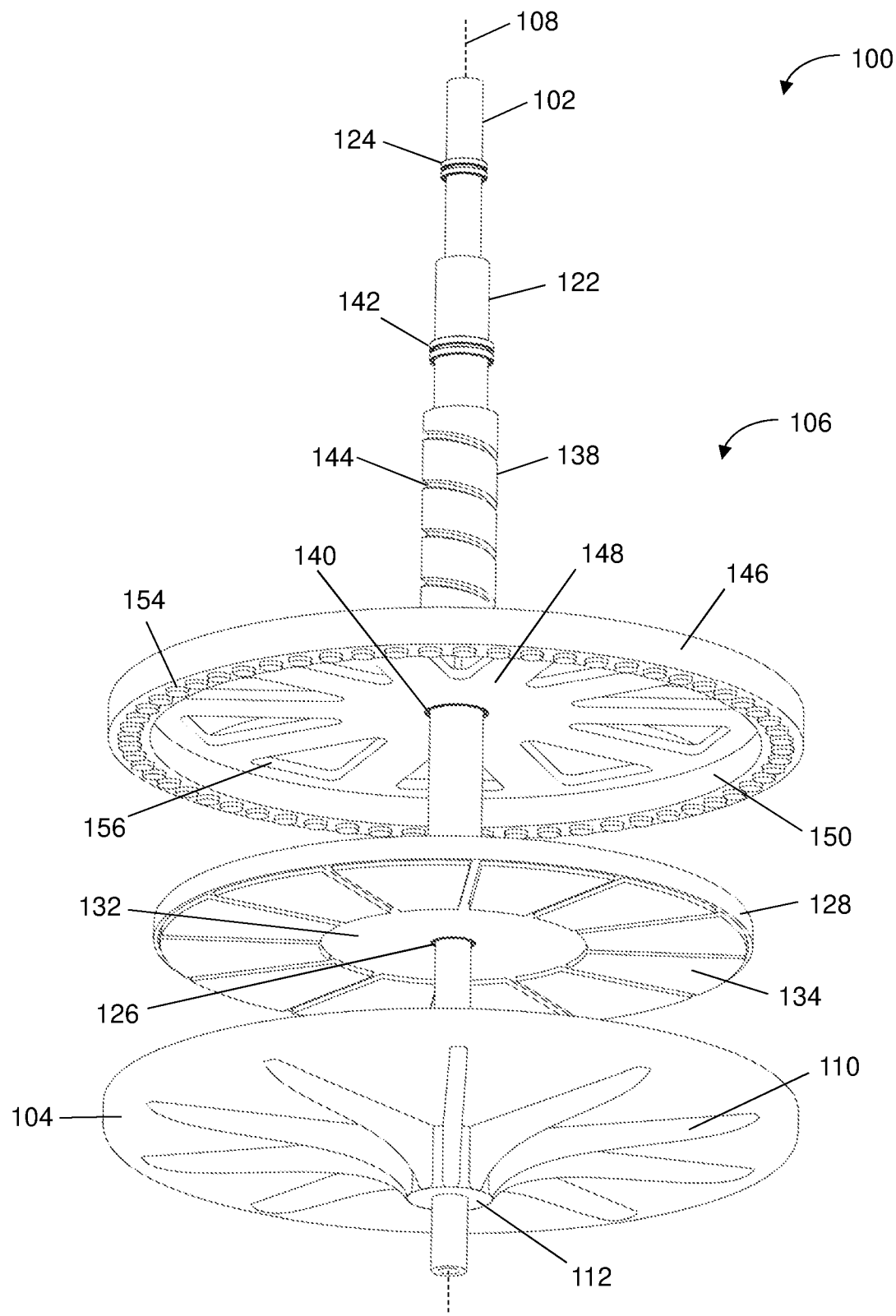
FIG. 7 is a bottom perspective, exploded view of a furling motor/generator assembly of an exemplary wind turbine of FIG. 1.
Figure 8:
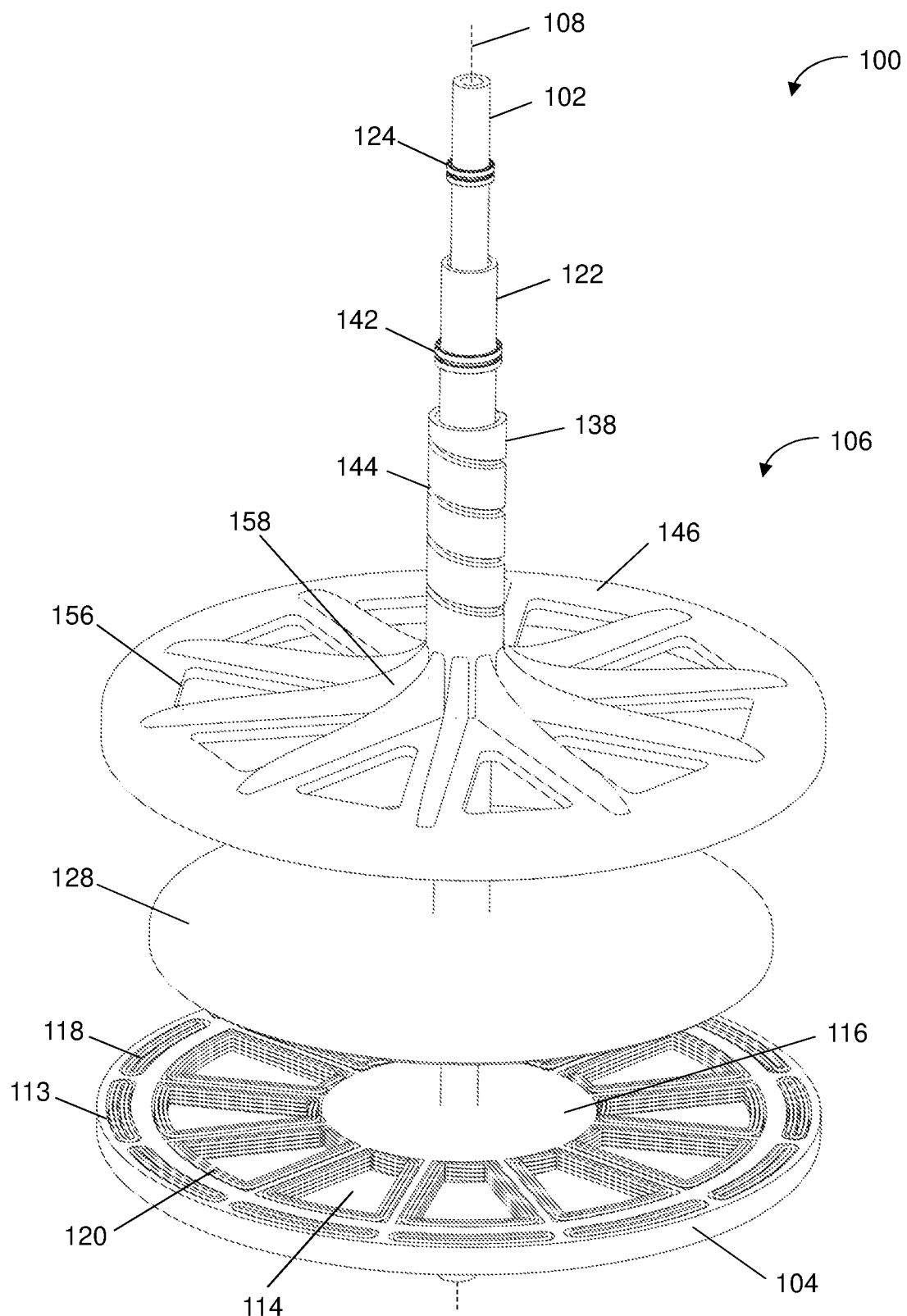
FIG. 8 is a top perspective, exploded view of a furling motor/generator assembly of an exemplary wind turbine of FIG. 1.
Figure 9:
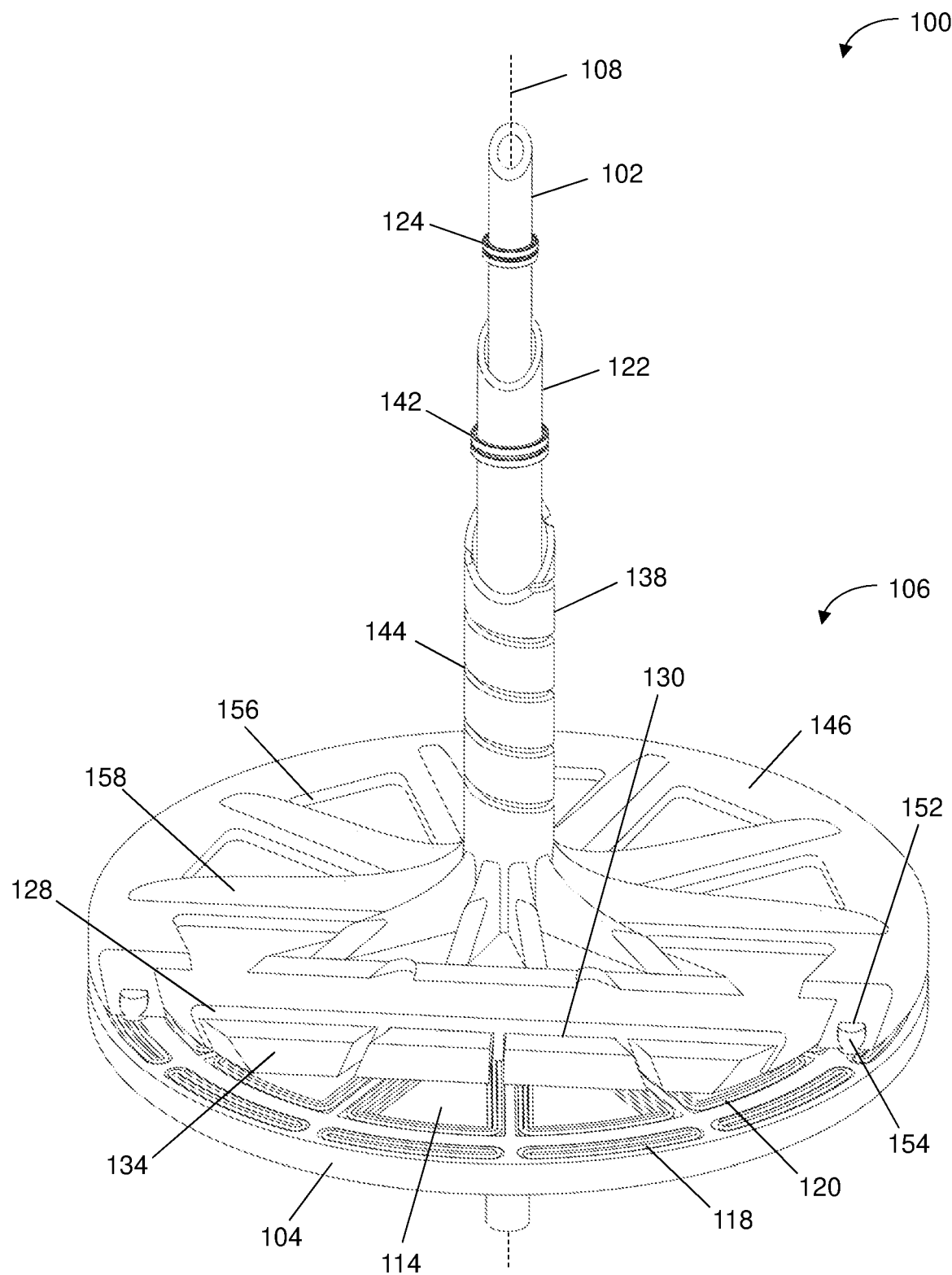
FIG. 9 is a perspective, cross-sectional view of a furling motor/generator assembly of an exemplary wind turbine of FIG. 1.
Figure 10:
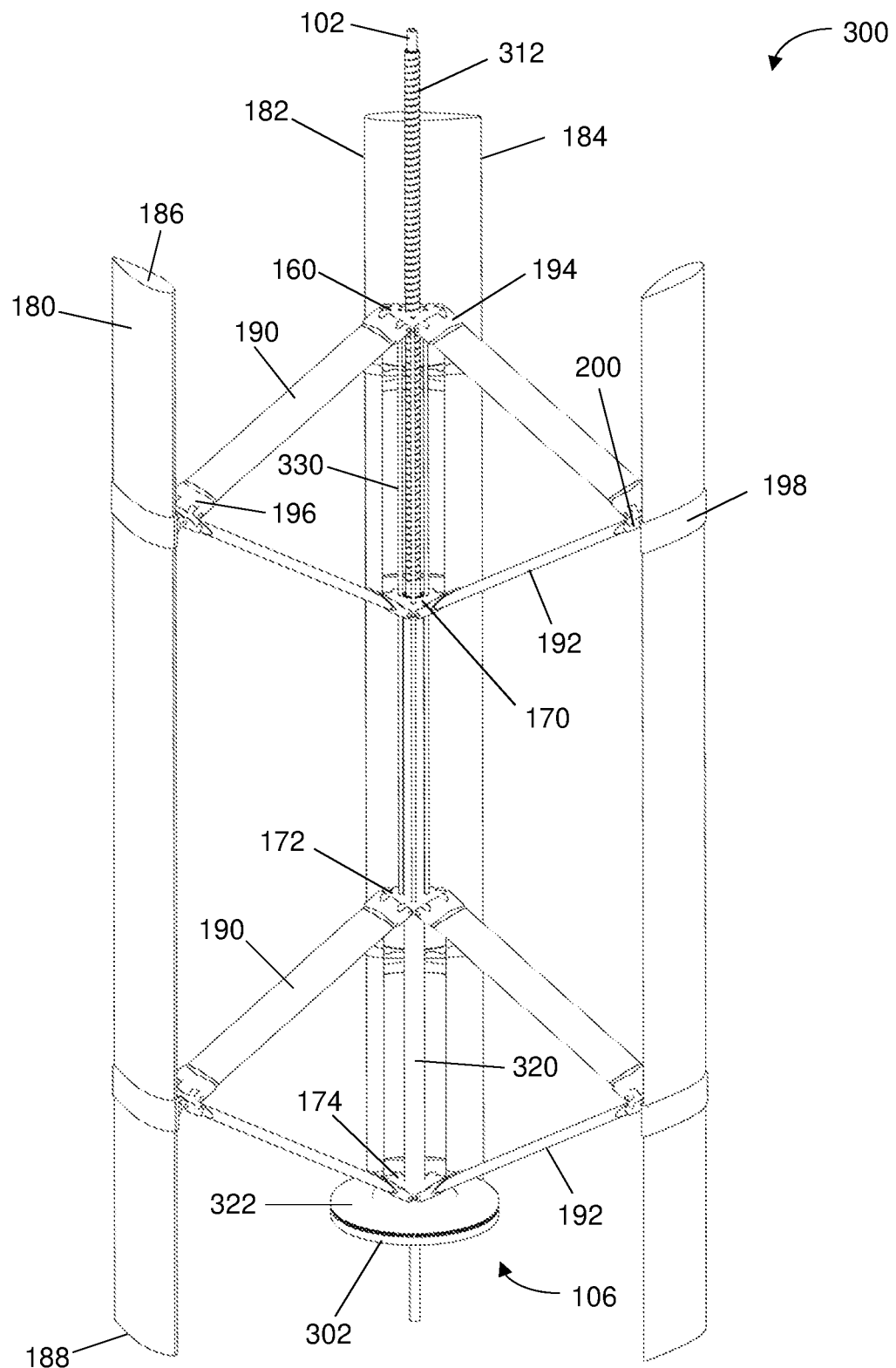
FIG. 10 is a perspective view of an exemplary wind turbine in accordance with the present disclosure in a partially furled or retracted position.
Figure 11:
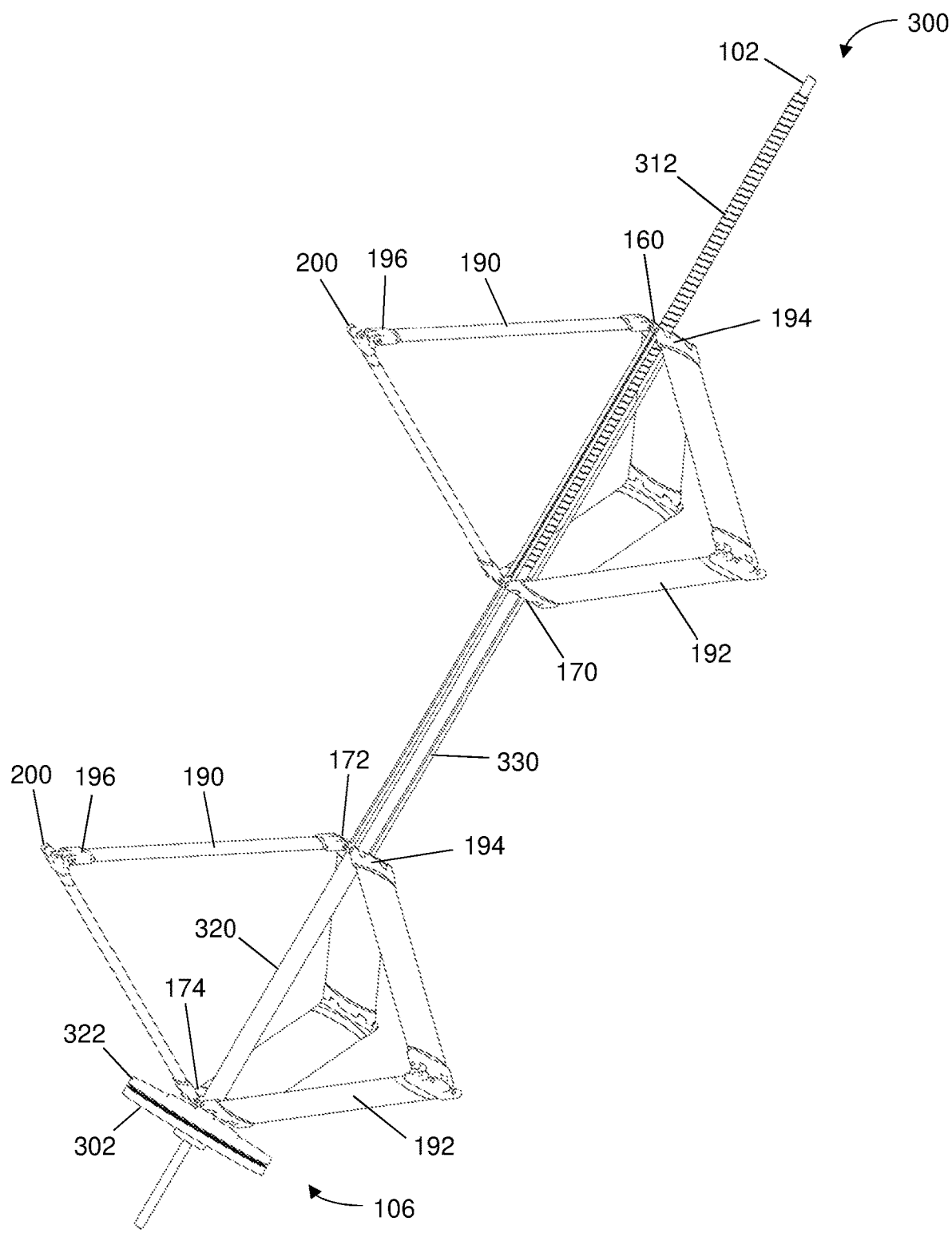
FIG. 11 is a perspective, partial view of an exemplary wind turbine of FIG. 10 in a partially furled or retracted position.
Figure 12:
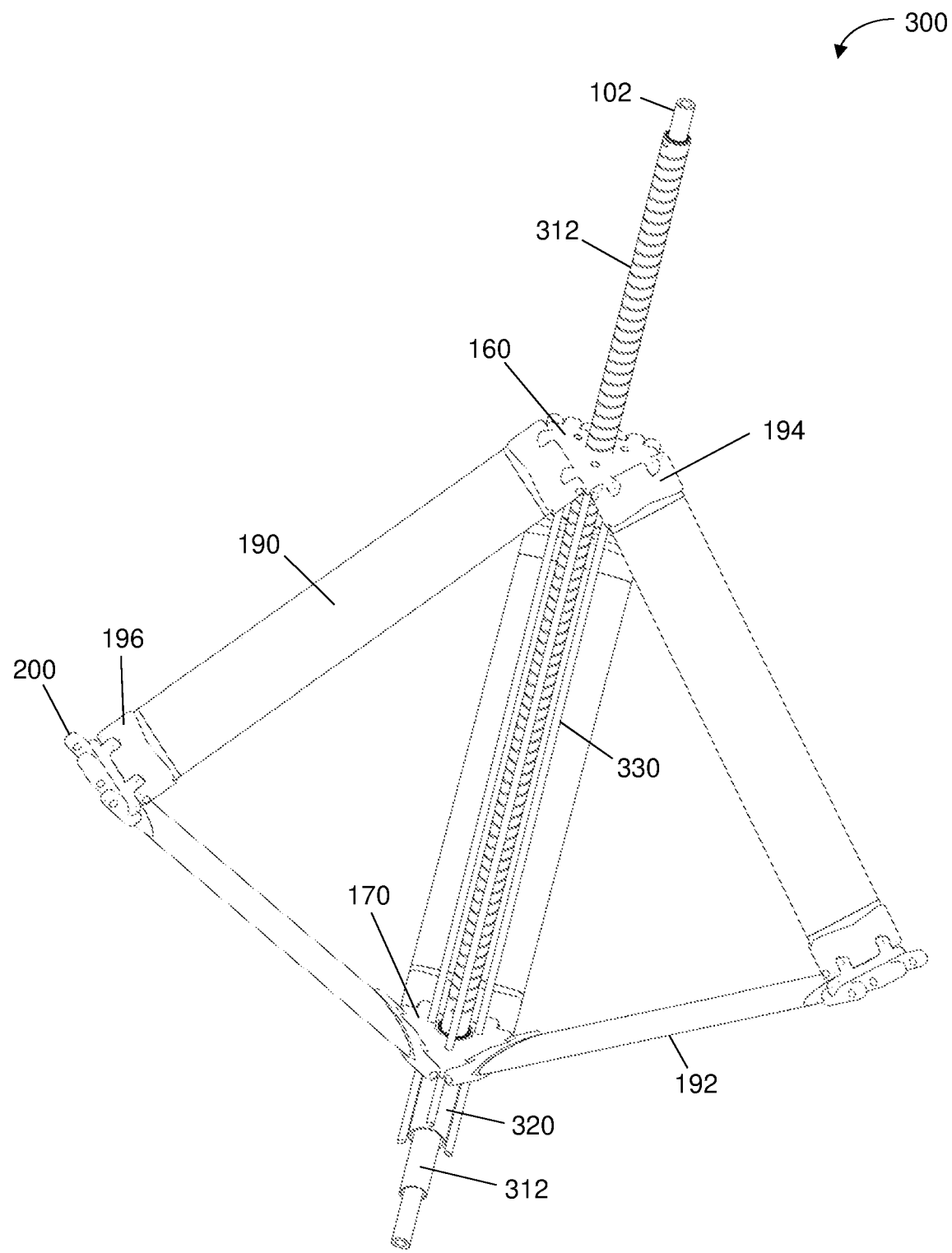
FIG. 12 is a perspective, partial view of an exemplary wind turbine of FIG. 10 in a partially furled or retracted position.
Figure 13:
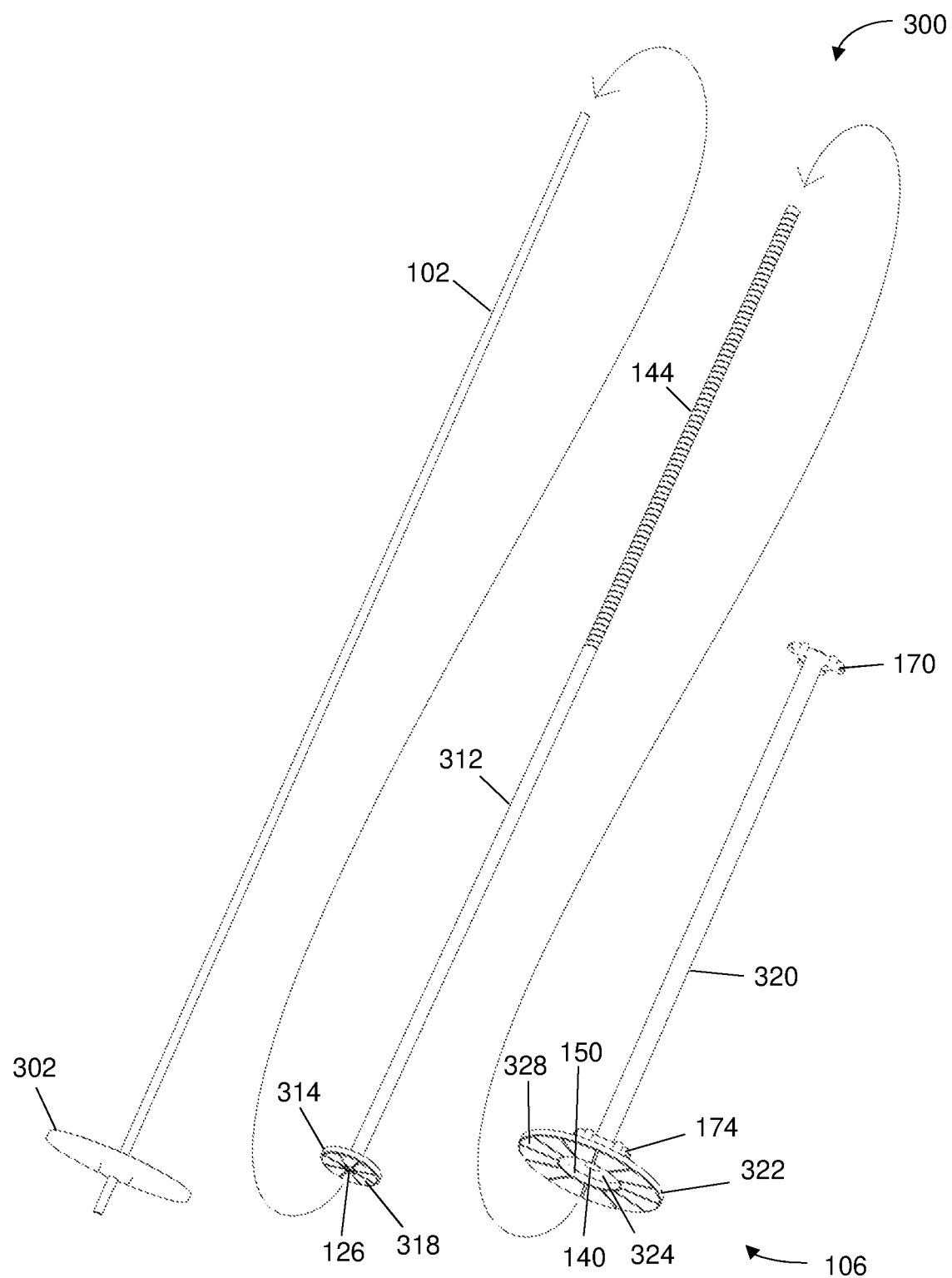
FIG. 13 is a perspective, exploded view of a furling motor/generator assembly of an exemplary wind turbine of FIG. 10.

As shown in FIG. 6, when the shafts 102, 122, 138 are concentrically assembled, the rotor housing 128 fits within the rotor housing 146, and the stator housing 104 and rotor housing 146 substantially encase the rotor housing 128 from opposing sides. The assembly of these components collectively forms an integrated furling motor/generator assembly 106, with the rotor housing 128 acting as the generator and/or motor rotor and the rotor housing 146 acting as the furling motor rotor. Such integrated assembly reduces the number of moving parts if separate assemblies were used, providing for less maintenance and wear of components. The top surface of the rotor housing 146 can include wedge or triangular shaped openings 156 extending through the recessed section 148. The openings 156 can assist with heat reduction or ventilation during operation of the assembly 106. The openings 156 can also assist with reduction of weight and material usage. In some embodiments, the rotor housing 146 can include radial ribs 158 extending along the top surface of the rotor housing 146 in-between the openings 156, and coupled to the outer shaft 138. Such ribs 158 can provide additional structural support to the rotor housing 146.

Figure 14:
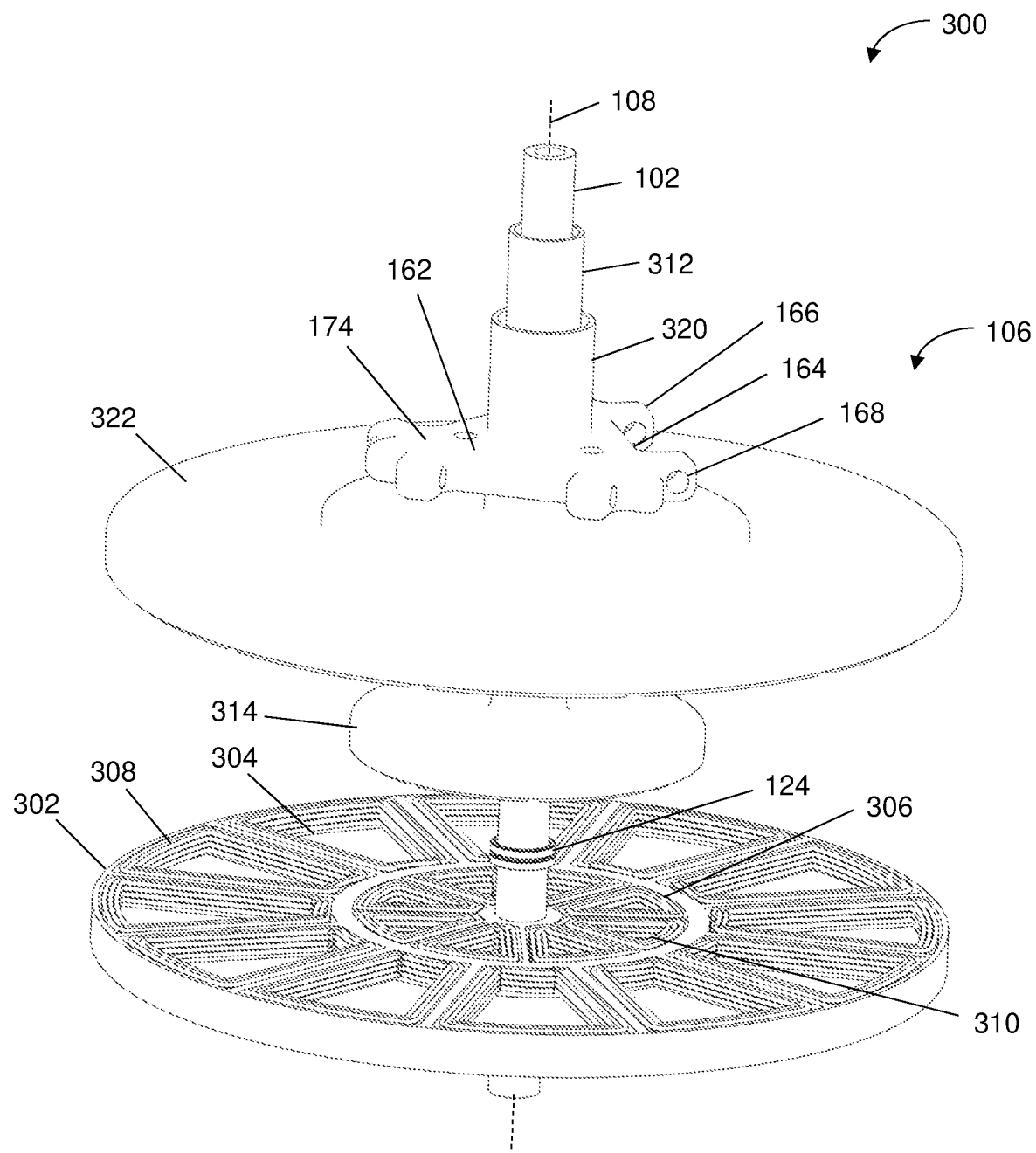
FIG. 14 is a top perspective, exploded view of a furling motor/generator assembly of an exemplary wind turbine of FIG. 10.
Figure 15:
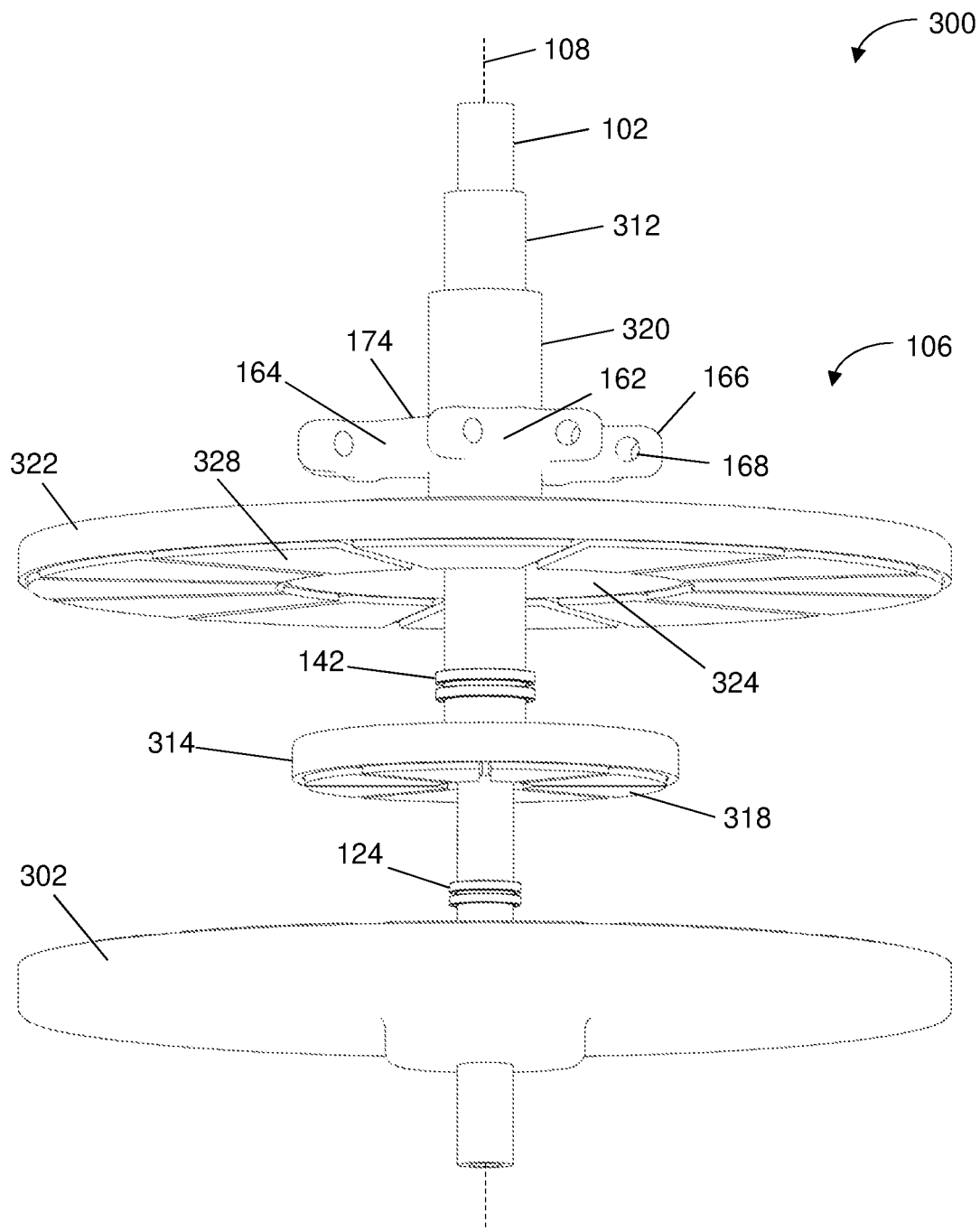
FIG. 15 is a bottom perspective, exploded view of a furling motor/generator assembly of an exemplary wind turbine of FIG. 10.
Figure 16:
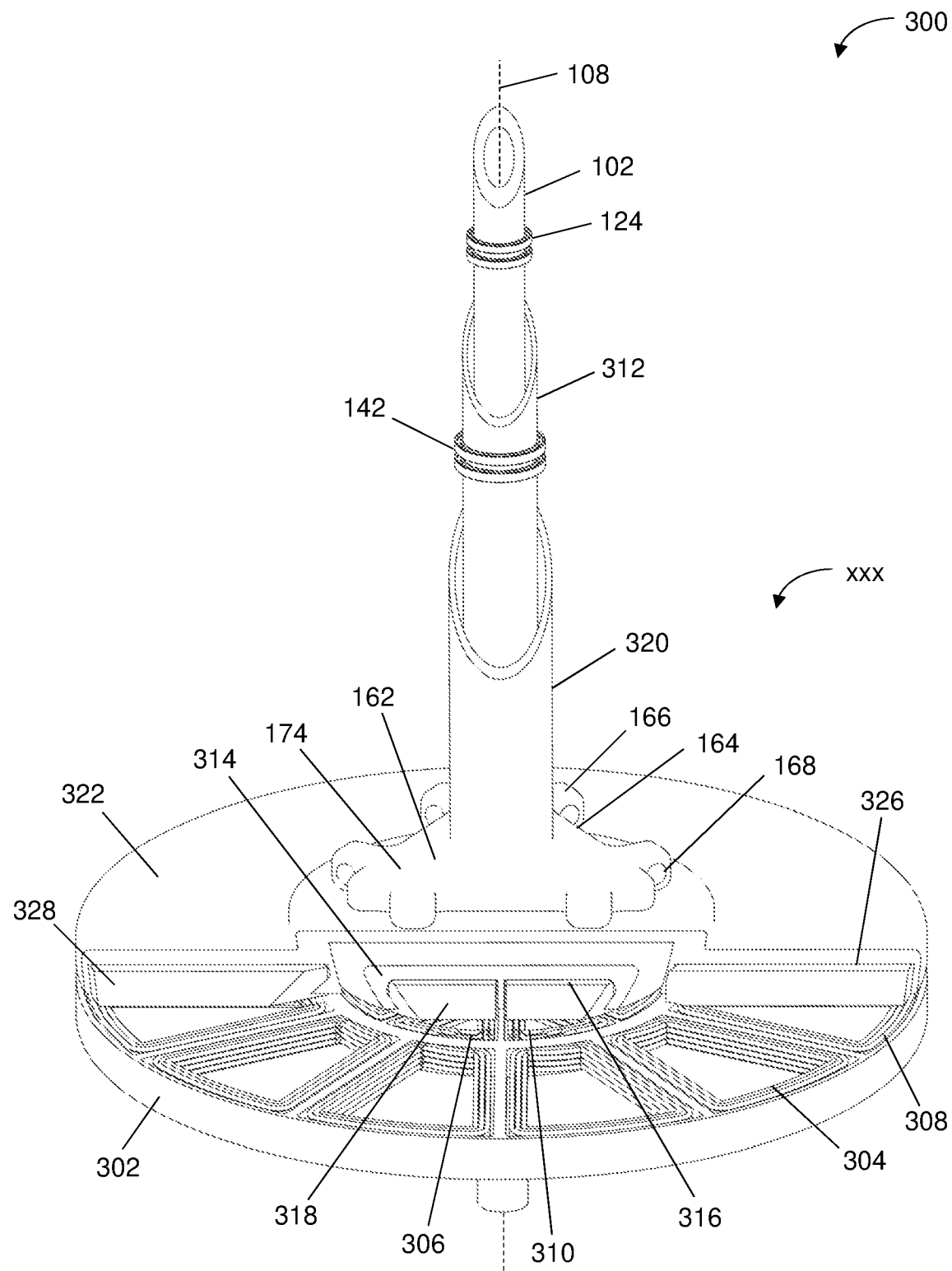
FIG. 16 is a perspective, cross-sectional view of a furling motor/generator assembly of an exemplary wind turbine of FIG. 10.

The wind turbine 100 includes a first strut mount 160 fixedly mounted at or near the top of the intermediate shaft 122. The strut mount 160 includes a central opening sized to receive the intermediate shaft 122, and fasteners (e.g., set screws, bolts, riveting, clamps, keyways, combinations thereof, or the like) can be used to secure the strut mount 160 to the intermediate shaft 122 such that rotation of the shaft 122 simultaneously rotates the strut mount 160. As illustrated in another embodiment of the wind turbine 300 shown in FIGS. 14-16 (which illustrates strut mount 174, having a substantially similar structure to strut mount 160), the strut mount 160 can generally define a triangular body 162 with U-shaped cutouts or sections 164 at each of the three sides, and two extensions 166 on opposing ends of the U-shaped sections 164. Each extension 166 includes an opening 168 capable of receiving a fastener for creating a pivot joint with a strut. Each of the strut mounts discussed herein can generally define the same configuration as the strut mount 160. Although discussed as substantially triangular in configuration, it should be understood that alternative configurations (e.g., square, circular, or the like) could be used. It should be further be understood that the strut mount configuration discussed herein can apply to any of the wind turbines of the present disclosure.

Still with reference to FIGS. 1-9, the wind turbine 100 includes a second strut mount 170 slidably positioned over the intermediate shaft 122. The strut mount 170 is positioned between the strut mount 160 and the assembly 106. The strut mount 170 includes a central opening sized to receive the intermediate shaft 122 therethrough, allowing for linear traversing or motion of the strut mount 170 along the intermediate shaft 122. The wind turbine 100 includes a third strut mount 172 fixedly positioned over the intermediate shaft 122. The strut mount 172 includes a central opening sized to receive the intermediate shaft 122 therethrough, and can be secured to the intermediate shaft 122 with, e.g., fasteners. Thus, rotation of the intermediate shaft 122 simultaneously rotates the strut mount 172 (due to the strut mount 172 being unified, tied or fixedly coupled to the intermediate shaft 122). The strut mount 172 is positioned between the strut mount 170 and the assembly 106.

The wind turbine 100 includes a fourth strut mount 174 threadingly mounted to the outer shaft 138. The strut mount 174 is positioned between the strut mount 174 and the assembly 106. The strut mount 174 includes a central opening with threads complementary to the threads 144 of the outer shaft 138 such that the strut mount 174 can rotate and translate along the length of the outer shaft 138 based on jack screw engagement with the threads 144. The wind turbine includes connecting tie rods 176 (e.g., three tie rods) fixedly mounted and extending between the strut mounts 170, 174. As an example, each strut mount 170, 174 can include openings that receive ends of the tie rods 176 for fixation therein. The strut mount 172 includes openings 178 formed in the body 162 complementary to the tie rods 176 such that the tie rods 176 can freely slide through the openings 178. The tie rods 176 therefore mechanically connect the strut mounts 170, 174.

In the fully extended or unfurled position, the strut mounts 160, 170 are disposed immediately adjacent to each other, and the strut mounts 172, 174 are disposed immediately adjacent to each other (see, e.g., FIG. 1). In the fully retracted or furled position, the strut mounts 160, 170 are moved away from each other, and the strut mounts 172, 174 are moved away from each other (see, e.g., FIG. 4), with the strut mounts 170, 172 being positioned closer to each other and the strut mount 174 positioned closer to the assembly 106.

The wind turbine 100 includes multiple two-part strut assemblies for support of each of the respective airfoils 180 (e.g., blades). Although illustrated with three airfoils 180, it should be understood that additional airfoils 180 could be used. The airfoils 180 can be fabricated from, e.g., stainless steel, fiber-reinforced plastic (FRP), aluminum, steel, plastic, or the like. Each airfoil 180 includes a body with a leading edge 182 and a trailing edge 184. Each airfoil 180 includes a top or proximal edge 186 and an opposing bottom or distal edge 188. The length of each airfoil 180 (as measured between the proximal and distal edges 186, 188) can be about, e.g., 2.2-2.8 m inclusive, 2.2-2.7 m inclusive, 2.2-2.6 m inclusive, 2.2-2.5 m inclusive, 2.2-2.4 m inclusive, 2.2-2.3 m inclusive, 2.3-2.8 m inclusive, 2.4-2.8 m inclusive, 2.5-2.8 m inclusive, 2.6-2.8 m inclusive, 2.7-2.8 m inclusive, 2.2 m, 2.3 m, 2.4 m, 2.5 m, 2.6 m, 2.7 m, 2.8 m, or the like. The airfoils 180 are radially positioned around the central longitudinal axis 108 (e.g., spaced by about 60 degrees) in a parallel orientation relative to the central longitudinal axis 108. The orientation of the airfoils 180 remains parallel (or substantially parallel) to the central longitudinal axis 108 in the fully open or extended position, the fully retracted or furled position, and any position in-between the fully extended and fully furled positions (i.e., at all stages of operation). Such orientation ensures that the airfoils 180 can continue to generate electricity using the assembly 106 at each of the stages of furling and unfurling, only stopping such generation when the airfoils 180 have been fully retracted into the stored position.

In the embodiment of FIGS. 1-9, each airfoil 180 is supported by two, two-part strut assemblies vertically spaced from each other. Each strut assembly includes an upper strut 190 and a lower strut 192. Each strut 190, 192 can define a substantially planar, rectangular form. In some embodiments, the top surface of the upper strut 190 and the bottom surface of the lower strut 192 can define an outwardly rounded or curved surface to allow for reduced air resistance, while the inwardly facing surfaces of the struts 190, 192 can be substantially planar to ensure the struts 190, 192 are positioned against each other along the entire length of the struts 190, 192.

The opposing ends of each of the struts 190, 192 include pivot supports 194, 196. The pivot supports 194 includes extensions configured to mate with the extensions 166 and openings 168 of the strut mounts 160, 170, 172, 174 such that a fastener can be used to create a pivot joint between the respective strut mounts 160, 170, 172, 174 and the pivot supports 194. As an example, the upper strut 190 of the top strut assembly is pivotably coupled to the first strut mount 160, the bottom strut 192 of the top strut assembly is pivotably coupled to the second strut mount 170, the upper strut 190 of the bottom strut assembly is pivotably coupled to the third strut mount 172, and the bottom strut 192 of the bottom strut assembly is pivotably coupled to the fourth strut mount 174. The pivot supports 196 pivotably couple the opposing end of the struts 190, 192 to respective airfoil mounting brackets 198 (e.g., airfoil holders) rigidly or fixedly coupled to the airfoils 180 in a spaced manner. In some embodiments, the pivot supports 196 can pivotably couple to an intermediate support bracket 200, and the support bracket 200 can be pivotably coupled to the mounting bracket 198. In each assembly, the struts 190, 192 pivotably couple to the same mounting bracket 198 to create a joint pivot point.

For clarity, operation of the wind turbine 100 is discussed herein first with respect to power generation specifics, and subsequently the furling/unfurling specifics. However, it should be understood that the power generation steps and the furling/unfurling steps can occur simultaneously. In power generation operation of the wind turbine 100, wind in the environment drives rotation of the airfoils 180 about the central longitudinal axis 108 (assuming a fully extended or any unfurled position of the airfoils 180). Based on the fixedly mounted configuration of the strut mount 160, 172 to the intermediate shaft 122, rotation of the airfoils 180 drives simultaneous rotation of the intermediate shaft 122. The interconnection between the strut mount 160 and the strut mount 170 through the strut assembly further results in simultaneous rotation of the strut mount 170. Strut mount 172 drives rotation of strut mount 174 through the strut assembly. As the strut mount 174 engages the high friction threads 144 of the outer shaft 138 (when the airfoils 180 are in the fully extended or any unfurled position), rotation of the strut mount 174 results in simultaneous rotation unison of the outer shaft 138 in the same direction (e.g., clockwise) as the intermediate shaft 122. This inherent rotation unison provides static linear translation prevention or position locking between the outer shaft 138 and the threaded strut mount, constantly maintaining any position or extent of the airfoils 180, unless acted on by the furling motor. As wind drives the wind turbine 100, all airfoils, struts, and strut mounts remain in revolution unison. No furling or unfurling can occur from wind interaction, and any position or extent of airfoil(s) 180 can be maintained. Intermediate shaft 122 transfers turbine wind driven torque to the integrated motor generator assembly 106, producing electricity.

With respect to the furling/unfurling operation, to furl the wind turbine 100 (e.g., fold or retract airfoils 180), irrespective of wind drive rotations per minute (rpm), an electric current of three phase rotating frequency can be induced in the generator/motor windings 120, while a counter electric current three phase rotating frequency is induced in the furling motor windings 118. This electromotive force causes a furling action to occur by the counter rotation of the inner rotor housing 128 (e.g., clockwise) and the outer rotor housing 146 (e.g., counter-clockwise), thereby driving intermediate and outer shafts 122, 138, actuating the jack screw configuration of the outer shaft 138 (i.e., the threads 144 engaged with the strut mount 174). This results in translation of the strut mount 174 in a linear direction towards the assembly 106. The rotation direction for furling is dictated by the outer shaft 138 thread direction (left or right handed). Translation of the strut mount 174 results in simultaneous linear translation of the strut mount 170 along the intermediate shaft 122 (due to the mechanical connection with the tie rods 176 which freely pass through the body of the strut mount 172), further resulting in folding or unfolding of the upper and lower strut 190, 192 assemblies to furl the airfoils 180. It should be understood that the electrical and mechanical actuation of the wind turbine 100 could be reversed to unfurl or extend, operating in an opposite or inverted manner.

The wind turbine 100 can include an inherent over speed safety mechanism for furling if certain conditions may result in damage to the wind turbine 100. Although discussed with respect to the wind turbine 100, it should be understood that the safety mechanism can be incorporated into any of the wind turbines discussed herein. For example, as a means of speed self-regulation or governing, the motor and generator windings 118, 120 can be electrically linked or shorted. External to the wind turbine 100, the generator/motor and furling motor lead wires can be shorted to activate the over speed safety mechanism protection. The electromotive force (EMF) produced in the generator windings 120 can drive the furling motor, with any significant wind driven rpm furling the wind turbine 100 without an additional external electrical power input.

FIGS. 10-16 are perspective, partial, exploded and cross-sectional views of an exemplary wind generator or turbine 300 (hereinafter "wind turbine 300"). The wind turbine 300 can be substantially similar in structure and function to the wind turbine 100, except for the distinctions noted herein. Therefore, same reference numbers refer to same structures. The airfoils 180 of the wind turbine 300 drive rotation of the outer shaft and the outer generator, while the inner motor drive the intermediate shaft and the furling jack screw.

At or near one of the ends, the inner shaft 102 includes a stator housing 302 fixedly mounted to the exterior of the inner shaft 102. The bottom or outer surface of the stator housing 302 can define a substantially flat or planar surface. The substantially flat top or inner surface of the stator housing 302 includes downwardly directed, wedge shaped recessed areas 304 formed therein, the areas 304 radially spaced around the central longitudinal axis 108. The stator housing 302 includes a set of triangular or wedge shaped recessed areas 306 formed in the top surface and within the radial confines of the recessed areas 304. The areas 306 are spaced from the areas 304 by a raised edge. The recessed areas 306 are radially spaced around the central longitudinal axis 108. The areas 304, 306 each receive respective windings 308, 310, with the windings 308 acting as the generator motor windings and the windings 310 acting as the furling motor stator windings.

The wind turbine 300 includes an intermediate shaft 312 (e.g., a second shaft) rotatably positioned over at least a portion of the inner shaft 102. The intermediate shaft 312 of the wind turbine 300 defines an outer surface having threads 144 formed at one end and a substantially smooth outer surface at the other end. In particular, the threads 144 can be formed from the proximal end of the intermediate shaft 312 to an approximately central point of the shaft 312, and the smooth outer surface can extend from the approximately central point of the shaft 312 to a rotor housing 314 fixedly mounted to the end of the shaft 312. The outer diameter of the rotor housing 314 is dimensioned smaller than the outer diameter of the stator housing 302.

The top surface of the rotor housing 314 defines a substantially planar surface. The bottom surface of the furling motor housing 314 includes wedge shaped recessed areas 316 radially formed around the central longitudinal axis 108. Each of the recessed areas 316 receives a complementary wedge-shaped magnet 318. The dimensions of the magnets 318 substantially correspond with the dimensions of the areas 306 and windings 310 of the stator housing 302. Rotation of the intermediate shaft 312 simultaneously results in rotation of the motor housing 314, with rotation movement of the magnets 318 relative to the windings 310 acting as a furling motor for the wind turbine 300.

The wind turbine 300 includes an outer shaft 320 (e.g., a third or outermost shaft) rotatably positioned over at least a portion of the intermediate shaft 312. At one of the ends (e.g., the distal end), the outer haft 320 includes a generator rotor housing 322 fixedly secured to the outer surface of the shaft 320. Thus, rotation of the shaft 320 simultaneously rotates the housing 322. The bottom surface of the rotor housing 322 includes a circular, central recessed section 324 having a diameter and depth complementary to the outer diameter of the motor housing 314 such that the motor housing 314 can entirely (or substantially entirely) fit within the volume of the recessed section 324.

The rotor housing 322 includes wedge-shaped openings 326 formed in the bottom surface and radially positioned in a spaced manner relative to the central longitudinal axis 108. Each opening 326 receives a complementary wedge-shaped magnet 328 such that the magnets 328 ate least partially extend beyond the plane defined by the bottom surface of the rotary housing 322. The size and position of the magnets 328 substantially corresponds with the size and position of the area 304 and windings 308 of the stator housing 302. Thus, when assembled with the stator housing 302, the position of the magnets 328 corresponds with the radial position of the windings 308 to form a generator for the wind turbine 300. When the shafts 102, 312, 320 are concentrically assembled, the stator housing 302 and rotor housing 322 substantially encase the motor housing 322 from opposing sides. The assembly of these components collectively forms an integrated furling motor/generator assembly 106.

In the embodiment of FIGS. 10-16, the strut mount 160 includes an opening with threads complementary to the threads 144 of the intermediate shaft 312, such that the strut mount 160 can translate up and down the intermediate shaft 312 based on rotational engagement of the threads 144. The strut mount 160 moves with the threaded intermediate shaft 312 based on mechanical connection of the strut mount 160 with the strut mount 172 via the tie rods 330. The strut mount 170 is fixed to the outer shaft 320 and the tie rods 330 can freely translate through corresponding openings in the strut mount 170. The strut mount 172 is free to translate along the outer shaft 320, while being coupled to the strut mount 160 via tie rods 330. The strut mount 174 is fixed to the outer shaft 320. Thus, translation of the strut mount 160 (through the tie rods 330) results in translation of the strut mount 172. Wind driven torque of the airfoils 180 drives rotation of the outer shaft 320 and the outer generator, (i.e., inducing current in windings 308) producing electricity. As wind drives the wind turbine 300, all airfoils, struts, and strut mounts remain in revolution unison. The outer shaft 320 and intermediate shaft 312 further remain in revolution unison, so maintaining static linear translation prevention or position locking of the threaded strut mount 160, unless acted on by the furling motor. No furling or unfurling can occur from wind interaction, and any position or extent of the airfoil(s) 180 can be maintained. To furl the wind turbine 300, the inner motor (i.e., windings 310) can drive the inner rotor housing 314 and, correspondingly, the intermediate shaft 312 and the furling jack screw configuration (i.e., threads 144 close threadingly engaging strut mount 160). The wind turbine 300 is therefore capable of operating as a generator/motor and furling motor configuration, and capable of furling or unfurling in a substantially similar manner to the wind turbine 100.

Figure 17:
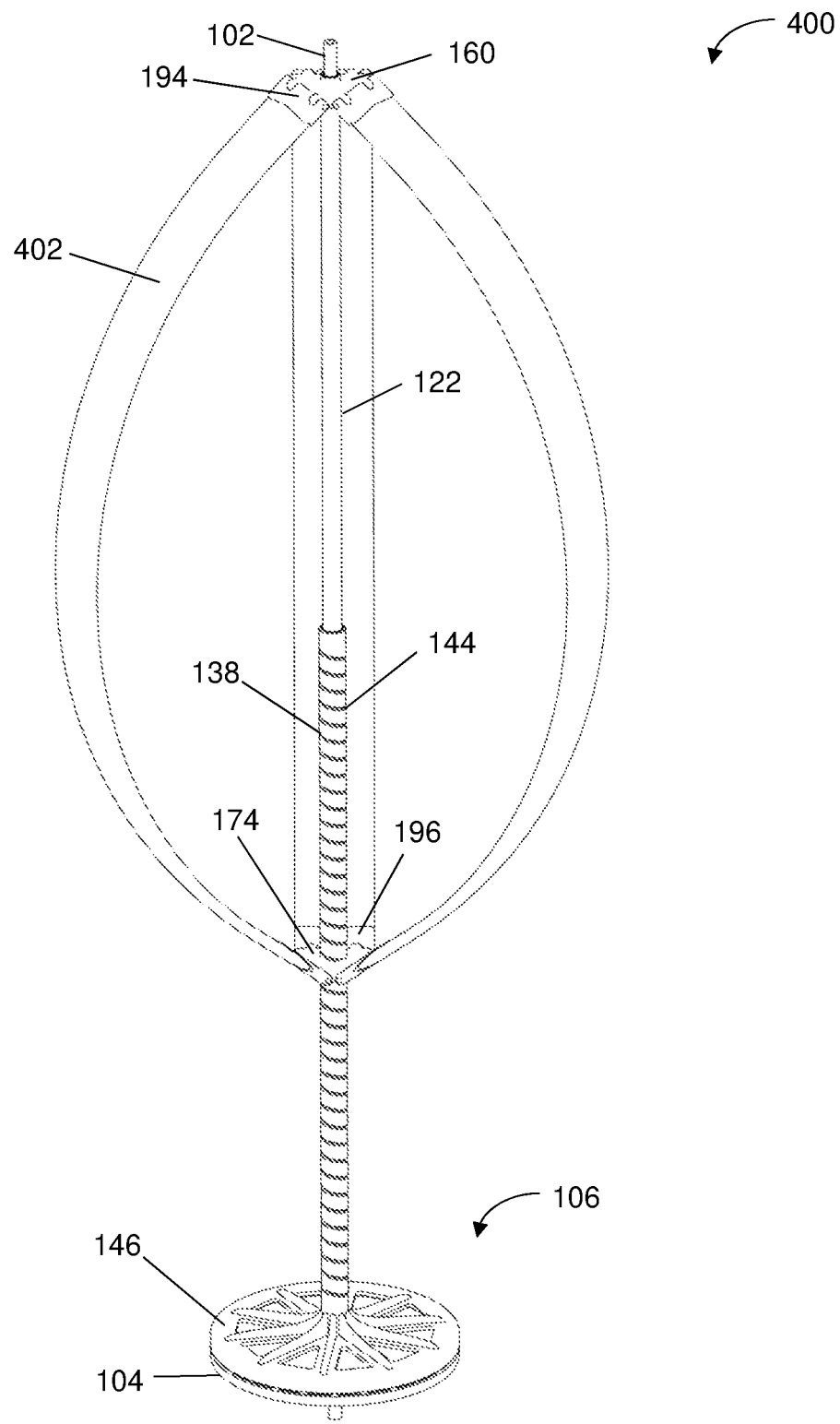
FIG. 17 is a perspective view of an exemplary wind turbine in accordance with the present disclosure in a fully extended position.
Figure 18:
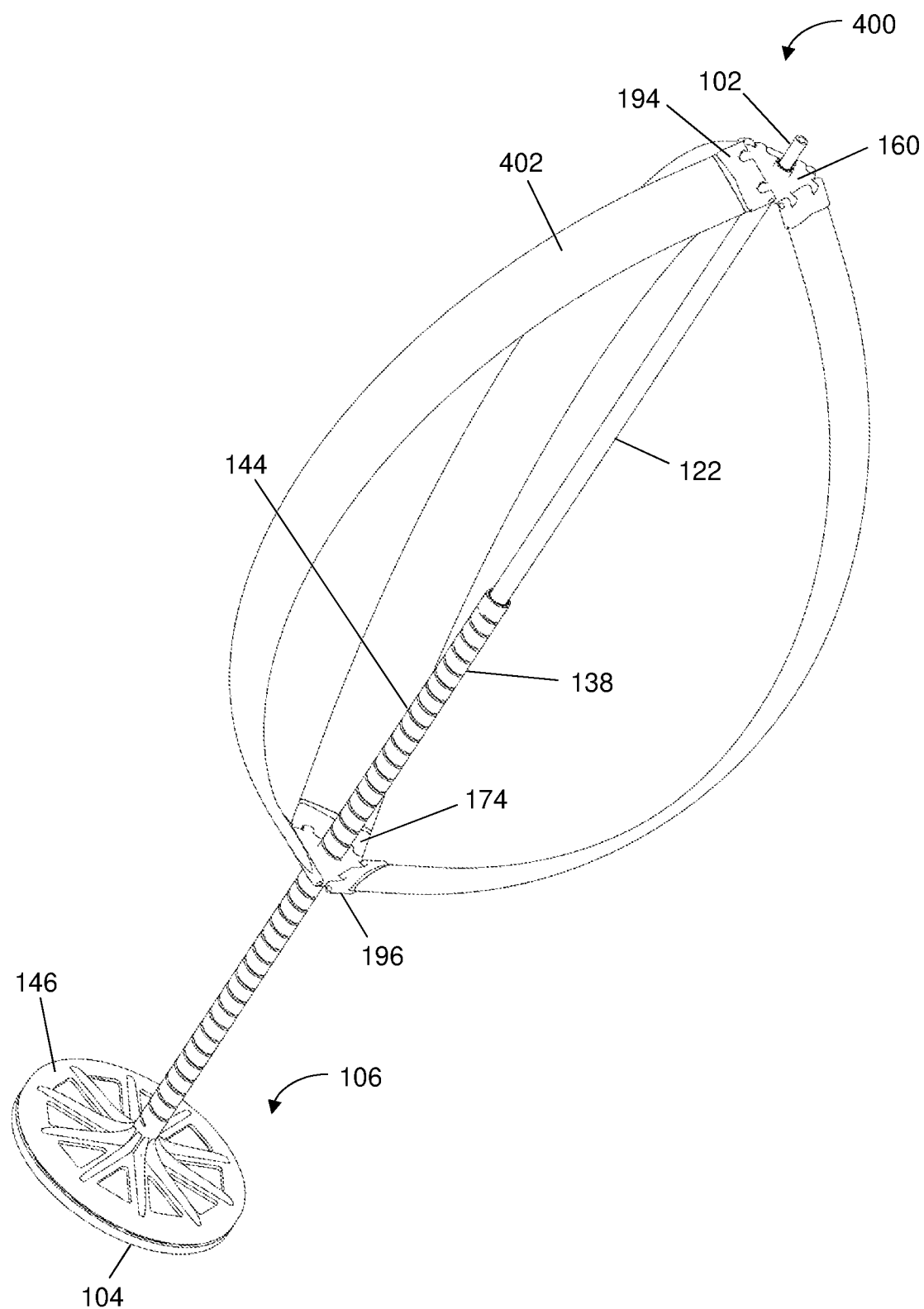
FIG. 18 is a perspective view of an exemplary wind turbine of FIG. 17 in a fully extended position.
Figure 19:
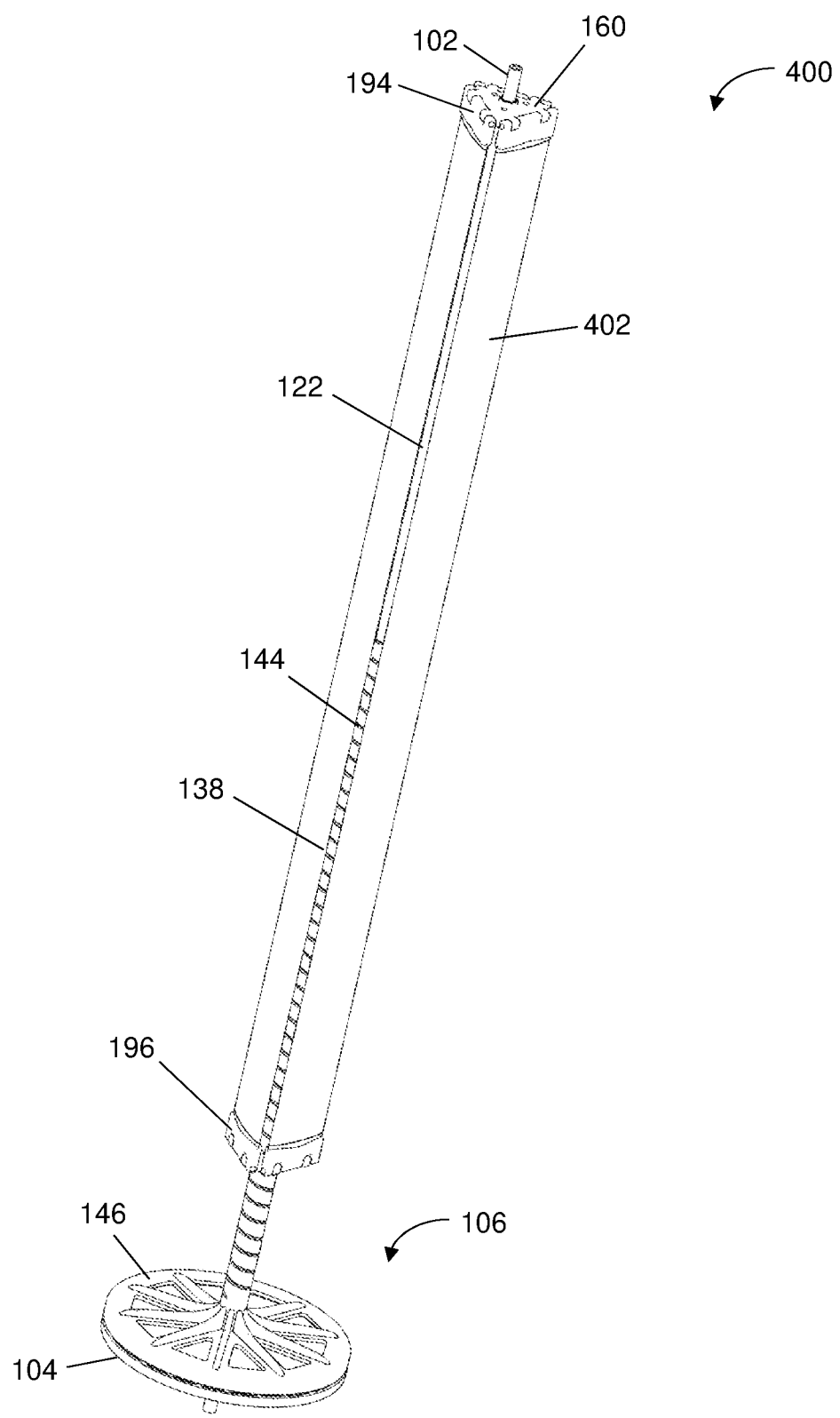
FIG. 19 is a perspective view of an exemplary wind turbine of FIG. 17 in a fully furled or retracted position.

FIGS. 17-19 are perspective views of an exemplary generator or turbine 400 (hereinafter "wind turbine 400"). The wind turbine 400 can be substantially similar in structure and function to the wind turbine 100, except for the distinctions noted herein. Therefore, same reference numbers refer to same structures. In particular, the shafts 102, 122, 138 and the assembly 106 can be substantially similar to the wind turbine 100. However, it should be understood that the shaft and assembly 106 arrangement of the wind turbine 300 could be incorporated into the wind turbine 400. Torque o the airfoils drives the intermediate shaft 122 and the inner generator, while the outer motor drives the outer shaft 138 and the furling jack screw to furl and unfurl the wind turbine 400.

Rather than rigid airfoils supported by strut assemblies, the wind turbine 400 includes three flexible airfoils 402 supported directly by the pivot supports 194, 196. The pivot supports 194, 196 are, in turn, pivotably coupled to only two strut mounts 160, 174. The strut mounts 160 is fixedly coupled to the inner shaft 102, and the strut mount 174 is threadingly engaged with the threads 144 of the outer shaft 138. Thus, rotation and translation of the strut mount 174 along the outer shaft 138 results in either furling or unfurling of the airfoils 402, depending on the direction of translation of the strut mount 174. The flexibility of the airfoils 402 allows the airfoils 402 to define an outwardly curving configuration in the fully extended position, and a substantially flat configuration in the fully furled position.

In each of the wind turbines described herein, an external controller communicatively connected to the wind turbine can be used to regulate the furling and unfurling motion. For example, the external controller can be used to drive and rotate the shaft associated with the furling motor or motor/generator, allowing for corresponding movement and/or rotation of the strut mounts to furl and unfurl the airfoils. In some embodiments, the external controlling could be associated with an integrated monitoring system configured to automatically furl and unfurl the airfoils depending on operating conditions. The wind turbines, if installed on a sailboat, may be operated while the sail is raised. The wind turbines could be operated in either full or partial airfoil extension, with the understanding that the partial airfoil extension may result in smaller generated power output.

In general, for each of the wind turbines discussed herein, all strut mounts, struts, and tie rods remain in rotational unison or alignment at all times. In particular, unless acted on by the furling motor, irrespective of wind driven rpm, all rotating shafts and the jack lead screw (outer or intermediate shaft versions) remain in constant rotational unison or alignment at any stage of furl, fold, or strut extent. For the wind turbines 100, 300 (having the jack lead screw on top or bottom), the nature of the linkages (strut mounts and struts) physically maintains the alignment. This is the case even though only two strut mounts are rigidly coupled to a shaft. In particular, the linkages (strut mounts and struts) act as a pivoting extension of a rigid shaft that can move or expand, but still returns any torque to the shaft strut mounts. The entire linkage mechanism accepts torque, while maintaining adequate alignment despite only one fixed strut mount end (per each double strut assembly). Essentially, in operation, only two distinct torque forces occur in the struts and strut mount for each of the wind turbines discussed herein: (i) wind driven airfoil torque, and (ii) jack lead screw torque. The wind driven airfoil torque has a shorter linkage pathway to a strut mount rigidly attached to a generator shaft, allowing for optimal acceptance of the highest forces in operation. The jack lead screw torque has static and unified rpm matched following drag torque, (not furling), or furling motor screw actuation torque (to furl).

With respect to the jack lead screw and furling motor, the lead screw shaft follows and maintains rotational alignment by two means when not actuated by the furling motor. First, inherent drag of the lead screw thread. Certain thread pitches, profiles, and engagement tolerances can be selected to provide greater friction. Second, closely spaced dual rotor magnetic pole alignment. The magnetic poles can align between inner and outer generator/furling motor rotors. This effectively creates a non-contact magnetic link (the strength of which is defined by magnetic strength, separation, and geometry). One or both of these features can be used to ensure the rotating shafts remain in rotational alignment to lock at any stage of airfoil extent or furl. Thus, the jack lead screw is never unintentionally back-driven by the axial strut mount force. Only by overcoming the built-in friction can the screw be driven or actuated to furl. In general, the turbine, fully extended and in extreme winds, would be at the highest centripetal load on the whole structure. In such instance, all struts are ideally situated exclusively in tension and the strut mounts are physically bottomed or at end of travel, thereby unloading the jack screw. Fully folded, the holding torque of the screw is minimal as the airfoils exert low centripetal force.

With respect to the built-in safety mechanism, the wind turbine design provides for a number of variations to self-regulate the speed. Described previously is an active electronic logic control of the wind turbine. Such control logic provides for optimal power generation and overall usage of the wind turbine. In some embodiments, a physical three pole switch can be manually activated by a user to retract the airfoils. Such switch engages electric continuity between the three phase windings of the motor/generator and the furling motor in each of the wind turbines discussed herein. Such action directs any current produced in the motor/generator to the furling motor to retract the airfoils. Any significant turbine speed causes the wind turbine to furl from any deployed position or extent.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A wind turbine, comprising:
a shaft assembly defining a central longitudinal axis;
strut mounts coupled to the shaft assembly;
airfoils directly or indirectly coupled to the strut mounts, the airfoils capable of being positioned in a fully extended orientation and a fully retracted orientation; and
a generator assembly connected to the shaft assembly, wherein rotation of the airfoils results in rotation of at least a portion of the shaft assembly to generate electrical current with the generator assembly;
wherein at least one of:
(i) the shaft assembly includes an inner shaft, an intermediate shaft, and an outer shaft, the intermediate shaft concentrically and rotatably positioned over the inner shaft, and the outer shaft concentrically and rotatably positioned over the intermediate shaft, and the strut mounts include a first strut mount fixedly coupled to the intermediate shaft, a second strut mount freely movable over the intermediate shaft, a third strut mount fixedly coupled to the intermediate shaft, and a fourth strut mount threadingly engaged with an outer surface of the outer shaft; or (ii) the generator assembly includes a stator housing, a generator rotor housing, and a furling motor rotor housing, and the stator housing is fixedly coupled to an inner shaft of the shaft assembly, the generator rotor housing is fixedly coupled to an intermediate shaft of the shaft assembly, and the furling motor rotor housing is fixedly coupled to an outer shaft of the shaft assembly; or (iii) the generator assembly includes a stator housing, a generator rotor housing, and a furling motor rotor housing, the stator housing includes a first set of windings positioned around a second set of windings, and the furling motor rotor housing includes a second set of magnets dimensionally and positionally corresponding with the first set of windings of the stator housing to generate a counter rotating electromotive force for furling and unfurling of the airfoils.

2. The wind turbine of claim 1, wherein if (i), the inner shaft is configured and dimensioned to receive therethrough a stay of a sailboat for installation of the wind turbine on the stay.

3. The wind turbine of claim 1, wherein if (i), the outer shaft includes threads formed in an outer surface of the outer shaft.

4. The wind turbine of claim 1, if (i), the wind turbine comprises comprising rods extending between and mechanically coupling the second strut mount to the fourth strut mount, the rods slidably extending through the third strut mount.

5. The wind turbine of claim 1, wherein the airfoils are indirectly coupled to the strut mounts with strut assemblies.

6. The wind turbine of claim 5, wherein each strut assembly includes an upper strut and a lower strut pivotably coupled to each other through a pivot support at one end, and pivotably coupled to respective strut members at opposing ends.

7. The wind turbine of claim 6, wherein in the fully extended orientation, the upper and lower struts are positioned against each other.

8. The wind turbine of claim 6, wherein in the fully retracted orientation, the upper and lower struts are spaced from each other and remain pivotably coupled to each other through the pivot support.

9. The wind turbine of claim 1, wherein the airfoils remain in a parallel orientation relative to the central longitudinal axis in both the fully extended orientation and the fully retracted orientation.

10. The wind turbine of claim 1, wherein the airfoils remain in a parallel orientation relative to the central longitudinal axis in intermediate orientations between the fully extended orientation and the fully retracted orientation.

11. The wind turbine of claim 1, wherein if (ii), the stator housing includes a first set of windings positioned around a second set of windings.

12. The wind turbine of claim 11, wherein the generator rotor housing includes a first set of magnets dimensionally and positionally corresponding with the second set of windings of the stator housing to generate the electrical current.

13. The wind turbine of claim 1, wherein the generator assembly includes a generator rotor/stator assembly and a furling motor/stator assembly integrally formed and connected to the shaft assembly.

14. A method of operating a wind turbine, comprising:
moving airfoils of the wind turbine from a fully retracted orientation to a fully extended orientation, wherein the airfoils are directly or indirectly coupled to strut mounts of the wind turbine, the strut mounts coupled to a shaft assembly of the wind turbine, the shaft assembly defining a central longitudinal axis;

wherein rotation of the airfoils results in rotation of at least a portion of the shaft assembly to generate electrical current with a generator assembly connected to the shaft assembly;

wherein at least one of:

(iv) the shaft assembly includes an inner shaft, an intermediate shaft, and an outer shaft, the intermediate shaft concentrically and rotatably positioned over the inner shaft, and the outer shaft concentrically and rotatably positioned over the intermediate shaft, and the strut mounts include a first strut mount fixedly coupled to the intermediate shaft, a second strut mount freely movable over the intermediate shaft, a third strut mount fixedly coupled to the intermediate shaft, and a fourth strut mount threadingly engaged with an outer surface of the outer shaft; or (v) the generator assembly includes a stator housing, a generator rotor housing, and a furling motor rotor housing, and the stator housing is fixedly coupled to an inner shaft of the shaft assembly, the generator rotor housing is fixedly coupled to an intermediate shaft of the shaft assembly, and the furling motor rotor housing is fixedly coupled to an outer shaft of the shaft assembly; or (vi) the generator assembly includes a stator housing, a generator rotor housing, and a furling motor rotor housing, the stator housing includes a first set of windings positioned around a second set of windings, and the furling motor rotor housing includes a second set of magnets dimensionally and positionally corresponding with the first set of windings of the stator housing to generate a counter rotating electromotive force for furling and unfurling of the airfoils.

* * * * *